(12) United States Patent
Xing et al.

(10) Patent No.: US 11,924,768 B2
(45) Date of Patent: Mar. 5, 2024

(54) DATA SENDING METHOD AND COMMUNICATION APPARATUS

(71) Applicant: HUAWEI TECHNOLOGIES CO., LTD., Guangdong (CN)

(72) Inventors: Shuangshuang Xing, Shenzhen (CN); Yiqun Wu, Shanghai (CN); Xiaomeng Chai, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 196 days.

(21) Appl. No.: 17/490,845

(22) Filed: Sep. 30, 2021

(65) Prior Publication Data

US 2022/0022140 A1 Jan. 20, 2022

Related U.S. Application Data

(63) Continuation of application No. PCT/CN2020/082953, filed on Apr. 2, 2020.

(30) Foreign Application Priority Data

Apr. 4, 2019 (CN) .......................... 201910272276.8

(51) Int. Cl.
*H04W 52/14* (2009.01)
*H04W 52/24* (2009.01)
(Continued)

(52) U.S. Cl.
CPC ....... *H04W 52/143* (2013.01); *H04W 52/242* (2013.01); *H04W 52/362* (2013.01); *H04W 72/1263* (2013.01); *H04W 74/0833* (2013.01)

(58) Field of Classification Search
None
See application file for complete search history.

(56) References Cited

U.S. PATENT DOCUMENTS 9,225,571 B2 * 12/2015 Han .................... H04L 27/2603
10,420,032 B2 * 9/2019 Hu ......................... H04W 52/06
(Continued)

FOREIGN PATENT DOCUMENTS

CN 101022380 A 8/2007
CN 101998464 A 3/2011
(Continued)

OTHER PUBLICATIONS

3GPP TSG RAN WG1 #96bis,R1-1904716,On 2-step RACH Procedure,Nokia, Nokia Shanghai Bell,Xi an, China, Apr. 8 12, 2019,total 16 pages.
(Continued)

*Primary Examiner* — Faiyazkhan Ghafoerkhan
(74) *Attorney, Agent, or Firm* — WOMBLE BOND DICKINSON (US) LLP

(57) ABSTRACT

The application provides a data sending method and a communication apparatus to avoid signaling overheads caused by scheduling by a network device, and a terminal device can flexibly select a quantity of repeated transmissions based on an actual situation, so that data transmission performance is improved. The network device sends configuration information of a receive power to the terminal device. After receiving the configuration information of the receive power, the terminal device determines a quantity of repeated transmissions of target data based on the configuration information of the receive power. After determining the quantity of repeated transmissions of the target data, the terminal device sends the target data to the network device based on the quantity of repeated transmissions of the target data.

18 Claims, 11 Drawing Sheets

(51) Int. Cl.
*H04W 52/36* (2009.01)
*H04W 72/1263* (2023.01)
*H04W 74/08* (2009.01)

(56) References Cited

U.S. PATENT DOCUMENTS

| | | | | |
|---|---|---|---|---|
| 2002/0181546 | A1* | 12/2002 | Odenwalder | H04L 7/041 375/130 |
| 2005/0041574 | A1* | 2/2005 | Wu | H04B 1/7105 370/208 |
| 2010/0284358 | A1* | 11/2010 | Han | H04L 27/2603 375/295 |
| 2010/0309877 | A1* | 12/2010 | Damnjanovic | H04W 74/002 370/329 |
| 2016/0222617 | A1* | 8/2016 | Fydenkevez | H05B 3/34 |
| 2017/0303204 | A1* | 10/2017 | Hu | H04W 52/325 |
| 2021/0051707 | A1* | 2/2021 | Rastegardoost | H04L 5/0051 |
| 2022/0022140 | A1* | 1/2022 | Xing | H04W 74/0833 |

FOREIGN PATENT DOCUMENTS

| | | |
|---|---|---|
| CN | 102457979 A | 5/2012 |
| CN | 104767595 A | 7/2015 |
| CN | 106961317 A | 7/2017 |
| CN | 107113875 A | 8/2017 |
| CN | 107888267 A | 4/2018 |
| CN | 108012329 A | 5/2018 |
| CN | 108282898 A | 7/2018 |
| CN | 108391219 A | 8/2018 |
| CN | 108882371 A | 11/2018 |
| CN | 109392066 A | 2/2019 |
| EP | 3223573 A1 | 9/2017 |
| EP | 3223573 A1 * | 9/2017 ............ H04W 52/06 |
| WO | 2013022774 A2 | 2/2013 |
| WO | 2018064367 A1 | 4/2018 |

OTHER PUBLICATIONS

Liu Zhen : "TD-LTE Terminal Chipset Key Technology Testing and Challenge",Feb. 28, 2011,total 5 pages.

Qualcomm Incorporated, "Power Ramping and Power Control for RACH Procedure", 3GPP TSG-RAN WG1 Meeting #90 R1-1713381, Aug. 25, 2017,total 7 pages.

3GPP TS 38.213 V15.5.0 (Mar. 2019), 3rd Generation Partnership Project; Technical Specification Group Radio Access Network; NR; Physical layer procedures for control(Release 15), 104 pages.

3GPP TSG RAN WG1 Meeting #96bis,R1-1903924,Further discussion on 2-step RACH procedure,Huawei, HiSilicon, Xi an, China, Apr. 8 Apr. 12, 2019,total 4 pages.

Interdigital, "PRACH power ramping and power calculation", 3GPP TSG-RAN WG2 #93 R2-161652, Feb. 19, 2016 ,total 4 pages.

3GPP TS 38.321 V15.4.0:"3rd Generation Partnership Project; Technical Specification Group Radio Access Network; NR; Medium Access Control (MAC) protocol specification (Release 15)",Dec. 2018,total 77 pages.

3GPP TSG-RAN WG1 NR adhoc R1-1700300,NR two-step random access procedure, Ericsson,Spokane, USA, Jan. 16-20, 2017,total 4 pages.

Huawei et al: "Consideration on Prach power ramping",3GPP Draft: R2-156469,Nov. 16, 2015,total 4 pages.

3GPP TSG-RAN WG1 #91 R1-1721042,Center of Excellence in Wireless Technology,NPRACH design aspects for the support of TDD NB-IoT,Dec. 1, 2017,total 5 pages.

\* cited by examiner

DATA SENDING METHOD AND COMMUNICATION APPARATUS

CROSS-REFERENCE TO RELATED APPLICATIONS

This application is a continuation of International Application No. PCT/CN2020/082953, filed on Apr. 2, 2020, which claims priority to Chinese Patent Application No. 201910272276.8, filed on Apr. 4, 2019. The disclosures of the aforementioned applications are hereby incorporated by reference in their entireties.

TECHNICAL FIELD

The application relates to the communication field, and more specifically, to a data sending method and a communication apparatus.

BACKGROUND

A wireless cellular network may provide a wireless communication service for a terminal device by deploying a network device, for example, a base station. The network device and the terminal device may perform data transmission.

With rapid development of ultra-reliable low-latency communication (URLLC), machine type communication (MTC), and the internet of things (IoT) in the future, sparse, small-packet, and reliable data transmission with a low-latency requirement has more application scenarios. Single-time transmission may not meet high reliability in such application scenarios. Consequently, data usually needs to be repeatedly transmitted.

For a quantity of repeated transmissions of the data, in a conventional technology, for example, in an existing random access procedure, a network device independently configures quantities of repeated transmissions for a terminal device at different coverage levels, and notifies the terminal device of the quantities of repeated transmissions. In this manner, signaling overheads are increased, and a latency may not be met.

SUMMARY

The application provides a data sending method and a communication apparatus, to avoid signaling overheads caused by scheduling by a network device, and a terminal device can flexibly select a quantity of repeated transmissions based on an actual situation, so that data transmission performance is improved.

In at least one embodiment, a data sending method is provided. The method may be performed by a terminal device, or may be performed by a chip or circuit configured in the terminal device. This is not limited in the application.

The method may include: The terminal device receives configuration information of a target receive power from a network device. The terminal device determines a quantity of repeated transmissions of target data based on the configuration information of the target receive power. The terminal device sends the target data based on the quantity of repeated transmissions of the target data.

Based on the foregoing technical solution, the terminal device may determine the quantity of repeated transmissions of the target data based on the configuration information that is of the receive power and that is sent by the network device. For example, when data needs to be repeatedly transmitted, the network device does not need to notify the terminal device of a quantity of repeated transmissions of the data, and the terminal device may determine the quantity of repeated transmissions of the data based on the receive power. In this way, not only signaling overheads caused by scheduling by the network device can be reduced, but also the terminal device may flexibly select the quantity of repeated transmissions of the data based on an actual situation, so that data transmission performance is improved.

In an embodiment, the configuration information of the receive power includes but is not limited to one or more of the following: a receive power, a maximum transmit power of the terminal device, a transmit power threshold, and the like. Details are described in the following embodiments.

In at least one embodiment, that the terminal device determines a quantity of repeated transmissions of target data based on the configuration information of the target receive power includes: The terminal device determines the quantity of repeated transmissions of the target data based on the configuration information of the target receive power and a power increment step. Alternatively, the terminal device determines the quantity of repeated transmissions of the target data based on the configuration information of the target receive power and a coverage level of the terminal device. Alternatively, the terminal device determines the quantity of repeated transmissions of the target data based on the configuration information of the target receive power, a power increment step, and a coverage level of the terminal device.

Based on the foregoing technical solution, when determining the quantity of repeated transmissions of the data, the terminal device may further consider an impact of the coverage level of the terminal device on the quantity of repeated transmissions of the data, or may further consider a factor such as the power increment step. Therefore, the quantity of repeated transmissions of the data may be selected for the terminal device based on an actual communication situation, so that data transmission performance is further improved.

In at least one embodiment, that the terminal device determines a quantity of repeated transmissions of target data based on the configuration information of the target receive power includes: The terminal device determines the quantity of repeated transmissions of the target data based on the configuration information of the target receive power and one or more of the following parameters: a transmit power of the terminal device, a candidate quantity of repeated transmissions, a path loss value obtained by the terminal device through measurement, or a parameter related to the transmit power of the terminal device.

Based on the foregoing technical solution, the terminal device may make the determined quantity of repeated transmissions of the data more appropriate by considering the one or more parameters.

In an embodiment, the parameter related to the transmit power of the terminal device may include, for example, an impact factor for determining the transmit power of the terminal device, for example, including but not limited to one or more of the following factors: a bandwidth factor, an MCS factor, a closed-loop power control adjustment factor, an asynchronous transmission impact factor, and the like.

In at least one embodiment, the quantity of repeated transmissions of the target data satisfies any one of the following formulas:

$P1+P2\cdot 10\cdot \log_{10} K \geq T;$ $P1+P2\cdot 10\cdot \log_{10} K \geq T$, and $K \geq K_{CElevel,min};$ $P1+(i-1)\cdot P3+P2\cdot 10\cdot \log_{10} K \geq T;$ or $P1+(i-1)\cdot P3+P2\cdot 10\cdot \log_{10} K \geq T$, and $K \geq K_{CElevel,min},$
where T is a transmit power threshold obtained through calculation based on the following parameters: the target receive power, the path loss value obtained by the terminal device through measurement, or the transmit power of the terminal device; P1 indicates the transmit power of the terminal device, and $P1_{max} \geq P1$, where $P1_{max}$ is a maximum transmit power of the terminal device; P2 indicates a repeated transmission gain adjustment factor; P3 indicates the power increment step; K indicates the quantity of repeated transmissions of the target data; i indicates that the terminal device sends the target data for an $i^{th}$ time, where i=1, 2, ..., K; and $K_{CElevel,min}$ indicates a minimum quantity of repeated transmissions corresponding to the terminal device at different coverage levels, and $K \geq K_{CElevel,min}$.

Based on the foregoing technical solution, the terminal device may determine the quantity of repeated transmissions of the data based on a transmit power threshold determined based on a receive power and any one of the foregoing formulas. In addition, an actual transmit power of the terminal device may also be determined.

In at least one embodiment, the method further includes: The terminal device determines a transmission parameter of the target data based on the quantity of repeated transmissions of the target data and a first mapping relationship, where the first mapping relationship is a correspondence between a quantity of repeated transmissions of data and a transmission parameter of the data.

Based on the foregoing technical solution, after determining the quantity of repeated transmissions of the data, the terminal device may further determine the transmission parameter for data transmission, so that signaling overheads caused by notifying a device of the transmission parameter by the network device can be reduced. For example, the network device may preconfigure a plurality of transmission parameters for the terminal device, and each transmission parameter corresponds to one or more quantities of repeated transmissions. In this way, for the terminal device, after determining the quantity of repeated transmissions of the target data, the terminal device may also determine a corresponding transmission parameter.

In an embodiment, that the transmission parameter is associated with the quantity of repeated transmissions of the data may also be understood as that the transmission parameter corresponds to the quantity of repeated transmissions of the data. A specific association or correspondence form is not limited. For example, a representation form of the association between a transmission parameter and a quantity of repeated transmissions of data may be in a form of a correspondence, a form of a table, a form in which the quantity of repeated transmissions of the data is carried in a configuration of the transmission parameter, or the like. This is not limited.

In at least one embodiment, the method further includes: The terminal device determines a random access preamble based on the quantity of repeated transmissions of the target data and a second mapping relationship, where the second mapping relationship includes a relationship between the quantity of repeated transmissions of the target data and the random access preamble. That the terminal device sends the target data based on the quantity of repeated transmissions of the target data includes: The terminal device sends the target data and the random access preamble based on the quantity of repeated transmissions of the target data.

Based on the foregoing technical solution, after determining the quantity of repeated transmissions of the data, the terminal device may further determine the random access preamble. For example, in a two-step random access procedure, the network device may preconfigure a plurality of random access preamble groups for the terminal device, and each random access preamble group corresponds to one or more quantities of repeated transmissions. In this way, for the terminal device, after determining the quantity of repeated transmissions of the target data, the terminal device may determine the random access preamble from a corresponding random access preamble group. For another example, the network device may further preconfigure a plurality of transmission parameters for the terminal device, and each transmission parameter corresponds to one quantity of repeated transmissions. In this way, for the terminal device, after determining the quantity of repeated transmissions of the target data, the terminal device may not only determine the random access preamble, but also determine the transmission parameter.

In an embodiment, the second mapping relationship includes a relationship between the quantity of repeated transmissions of the target data and the random access preamble, and indicates that there is a direct or indirect relationship between a quantity of repetitions of target data and a random access preamble. That is, the terminal device may determine the random access preamble based on the second mapping relationship and the determined quantity of repeated transmissions of the target data.

In at least one embodiment, the second mapping relationship is a relationship between a quantity of repeated transmissions of data and a random access preamble; the second mapping relationship is a relationship between a quantity of repeated transmissions of data and a random access preamble group; the second mapping relationship is a relationship between a quantity of repeated transmissions of data and a random access slot; or the second mapping relationship is a relationship between a quantity of repeated transmissions of data and a transmission parameter of the data.

Based on the foregoing technical solution, the random access preamble or the random access preamble group may be associated with the quantity of repeated transmissions of the data, and the transmission parameter may also be associated with the quantity of repeated transmissions of the data. According to the association relationship, after determining the quantity of repeated transmissions of the data, the terminal device may determine the random access preamble and the transmission parameter.

In at least one embodiment, the transmission parameter of the data includes one or more of the following parameters: a time-frequency resource, a port of a demodulation reference signal DMRS, and a port group to which the port for demodulating the DMRS belongs.

In at least one embodiment, the method further includes: The terminal device monitors response information for the target data in a first time window; and/or the terminal device monitors response information for the random access preamble in a second time window.

In an embodiment, the first time window and the second time window may be the same or different.

In at least one embodiment, the terminal device monitors response information for the target data in a time window, where a start location of the time window is a location at which the terminal device completes sending the target data for an $m^{th}$ time, or the first location that can be used to monitor a corresponding physical downlink control channel after the terminal device sends the target data for an $n^{th}$ time, where m=0, 1, ..., K, and n=0, 1, ..., K.

In at least one embodiment, the target receive power is a target receive power of the target data.

In at least one embodiment, that the terminal device determines a quantity of repeated transmissions of target data based on the configuration information of the target receive power includes: The terminal device determines, based on the configuration information of the target receive power, a quantity of repeated transmissions of a physical uplink shared channel PUSCH in a first message MsgA in a random access procedure, where the MsgA includes the PUSCH and a random access preamble, and a quantity of repeated transmissions of the random access preamble is the same as the quantity of repeated transmissions of the PUSCH.

In an embodiment, in a two-step random access procedure, the PUSCH and the random access preamble may be transmitted as one transmission unit. In this case, the quantity of repeated transmissions of the random access preamble is the same as the quantity of repeated transmissions of the PUSCH.

In at least one embodiment, the method further includes: When a quantity of transmissions of the target data does not reach the quantity of repeated transmissions of the target data, the terminal device receives acknowledgment response information for the target data, and stops sending the target data.

Based on the foregoing technical solution, when the terminal device determines that the network device successfully receives data, the terminal device may interrupt remaining unfinished repeated transmission of the data, to reduce signaling overheads and save resources.

In at least one embodiment, a data receiving method is provided. The method may be performed by a network device, or may be performed by a chip or circuit configured in the network device. This is not limited in the application.

The method may include: The network device configures a resource for a terminal device, where the resource is associated with a quantity of repeated transmissions of data. The network device detects, on the configured resource, the data sent by the terminal device.

Based on the foregoing technical solution, the network device associates the resource with the quantity of repeated transmissions of the data. For example, the network device may preconfigure a plurality of resources for the terminal device, and each resource corresponds to one or more quantities of repeated transmissions. In this way, for the terminal device, after determining the quantity of repeated transmissions of the data, the terminal device may also determine a corresponding resource. In this way, not only signaling overheads caused by scheduling by the network device can be reduced, but also the terminal device may flexibly select the quantity of repeated transmissions of the data based on an actual situation, so that data transmission performance is improved.

In at least one embodiment, a target receive power and/or a transmit power threshold are/is configured for the terminal device.

In at least one embodiment, the transmit power threshold is obtained through calculation based on the following parameters: the target receive power, a path loss value obtained by the network device through measurement, or a transmit power of the terminal device.

In at least one embodiment, a data sending method is provided. The method may be performed by a terminal device, or may be performed by a chip or circuit configured in the terminal device. This is not limited in the application.

The method may include: A terminal device receives information about a transmit power threshold from a network device. The terminal device determines a quantity of repeated transmissions of target data based on the transmit power threshold. The terminal device sends the target data based on the quantity of repeated transmissions of the target data.

Based on the foregoing technical solution, the network device may configure the transmit power threshold for the terminal device, and notify the terminal device of the transmit power threshold. The terminal device may determine a quantity of repeated transmissions of data based on the transmit power threshold. In this way, the terminal device may flexibly select the quantity of repeated transmissions of the data based on an actual situation, so that data transmission performance is improved.

In an embodiment, the transmit power threshold is obtained through calculation based on the following parameters: a target receive power, a path loss value obtained by the network device through measurement, or a transmit power of the terminal device.

In at least one embodiment, the quantity of repeated transmissions of the target data satisfies any one of the following formulas: $P1+P2\cdot10\cdot\log_{10}K \geq T$; $P1+P2\cdot10\cdot\log_{10}K \geq T$, and $K \geq K_{CElevel,min}$; $P1+(i-1)\cdot P3+P2\cdot10\cdot\log_{10}K \geq T$; or $P1+(i-1)\cdot P3+P2\cdot10\cdot\log_{10}K \geq T$, and $K \geq K_{CElevel,min}$, where T is the transmit power threshold; P1 indicates the transmit power of the terminal device, and $P1_{max} \geq P1$; $P1_{max}$ is a maximum transmit power of the terminal device; P2 indicates a repeated transmission gain adjustment factor; P3 indicates a power increment step; K indicates the quantity of repeated transmissions of the target data; i indicates that the terminal device sends the target data for an $i^{th}$ time, where i=1, 2, ..., K; and $K_{CElevel,min}$ indicates a minimum quantity of repeated transmissions corresponding to the terminal device at different coverage levels, and $K \geq K_{CElevel,min}$.

In at least one embodiment, a communication apparatus is provided. The communication apparatus is configured to perform embodiments of the methods as described in the application. In at least one embodiment, the communication apparatus may include a module configured to perform embodiments of the methods as described in the application.

In at least one embodiment, a communication apparatus is provided. The communication apparatus includes a memory and a processor, the memory is configured to store instructions, and the processor is configured to execute the instructions stored in the memory, so that the communication apparatus is enabled to perform embodiments of the methods as described in the application.

In at least one embodiment, a chip is provided. The chip includes a processing module and a communication interface, the processing module is configured to control the communication interface to communicate with the outside, and the processing module is further configured to perform embodiments of the methods as described in the application.

In at least one embodiment, a computer-readable storage medium is provided. The computer-readable storage medium stores a computer program, and when the computer program is executed by a communication apparatus, the communication apparatus is enabled to perform embodiments of the methods as described in the application.

In at least one embodiment, a computer program product including instructions is provided. When the instructions are executed by a computer, a communication apparatus is enabled to perform embodiments of the methods as described in the application.

Based on embodiments of the application, for data that needs to be repeatedly transmitted, the terminal device may determine a quantity of repeated transmissions of the to-be-transmitted data based on a receive power, for example, a receive power of the to-be-transmitted data. In this way, signaling overheads caused by scheduling by the network device can be reduced. In addition, the terminal device may flexibly select the quantity of repeated transmissions to be transmitted based on an actual situation, so that data transmission performance can be improved.

DESCRIPTION OF EMBODIMENTS

The following describes the technical solutions in the application with reference to the accompanying drawings.

The technical solutions of embodiments of the application may be applied to various communication systems, such as a future 5th generation (5G) system or a new radio (NR) system, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), and a worldwide interoperability for microwave access (WiMAX) communication system. The technical solutions of the embodiments of the application may further be applied to device-to-device (D2D) communication, machine-to-machine (M2M) communication, machine type communication (MTC), and communication in an internet of vehicles system. Communication manners in the internet of vehicles system are collectively referred to as V2X (X represents anything). For example, the V2X communication includes vehicle to vehicle (V2V) communication, vehicle to infrastructure (V2I) communication, vehicle to pedestrian (V2P) communication, vehicle to network (V2N) communication, and the like.

To facilitate understanding of the embodiments of the application, a communication system according to an embodiment of the application is first described in detail with reference to FIG. 1 and FIG. 2.

Figure 1:
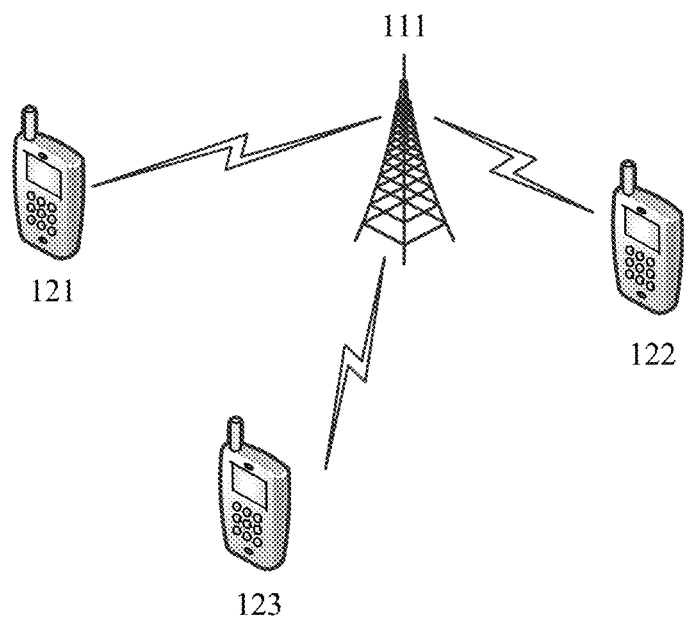
FIG. 1 is a schematic diagram of a communication system according to an embodiment of the application.

FIG. 1 is a schematic diagram of a wireless communication system 100 according to an embodiment of the application. As shown in FIG. 1, the wireless communication system 100 may include at least one network device, for example, a network device 111 shown in FIG. 1. The wireless communication system 100 may further include at least one terminal device, for example, a terminal device 121, a terminal device 122, a terminal device 123 shown in FIG. 1. A plurality of antennas may be configured for both the network device and the terminal device, and the network device and the terminal device may communicate by using a multi-antenna technology.

When the network device communicates with the terminal device, the network device may manage one or more cells, and there may be an integer quantity of terminal devices in one cell. In an embodiment, the network device 111 and the terminal device 121 to the terminal device 123 form a communication system with a single cell. Without loss of generality, the cell is denoted as a cell #1. The network device 111 may be a network device in the cell #1, or the network device 111 may serve a terminal device (for example, the terminal device 121) in the cell #1.

It should be noted that a cell may be understood as an area within wireless signal coverage of the network device.

Figure 2:
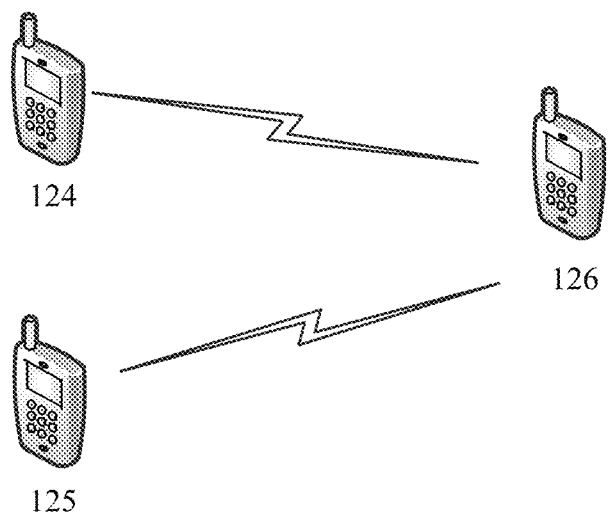
FIG. 2 is another schematic diagram of a communication system according to an embodiment of the application.

FIG. 2 is another schematic diagram of a wireless communication system 200 according to an embodiment of the application. As shown in FIG. 2, technical solutions of embodiments of the application may further be applied to D2D communication. The wireless communication system 200 includes a plurality of terminal devices, for example, a terminal device 124 to a terminal device 126 in FIG. 2. The terminal device 124 to the terminal device 126 may directly communicate with each other. For example, the terminal device 124 and the terminal device 125 may separately or together send data to the terminal device 126.

It should be understood that FIG. 1 and FIG. 2 are merely examples for description, and the application is not limited thereto. For example, the embodiments of the application may be further applied to a random access scenario (for example, a 5G NR random access procedure). For another example, the embodiments of the application may be further applied to any communication scenario in which data needs to be repeatedly transmitted.

It should be understood that a network device in the wireless communication system may be any device that has a wireless transceiver function. The device includes but is not limited to an evolved NodeB (eNB), a radio network controller (RNC), a NodeB (Node B, NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system, one antenna panel or a group of antenna panels (including a plurality of antenna panels) of a base station in a 5G system, or a network node, such as a baseband unit (BBU) or a distributed unit (DU), that constitutes a gNB or a transmission point.

In some deployments, the gNB may include a centralized unit (CU) and a DU. The gNB may further include an active antenna unit (AAU). The CU performs some functions of the gNB, and the DU performs some functions of the gNB. For example, the CU is responsible for processing a non-real-time protocol and a service, to performs functions of a radio resource control (RRC) layer and a packet data convergence protocol (PDCP) layer. The DU is responsible for processing a physical layer protocol and a real-time service, and performs functions of a radio link control (RLC) layer, a media access control (MAC) layer, and a physical (PHY) layer. The AAU performs some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in an access network (AN), or may be a network device in a core network (CN). This is not limited in the application.

It should be further understood that a terminal device in the wireless communication system may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in the embodiments of the application may be a mobile phone, a tablet computer, a computer having the wireless transceiver function, a virtual reality (VR) terminal device, an augmented reality (AR) terminal device, a wireless terminal in industrial control, a wireless terminal in self-driving (self-driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of the application.

For ease of understanding the embodiments of the application, the following first briefly describes several terms in the application.

1. Four-Step Random Access Procedure

One random access manner is four-step random access. The four-step random access is merely a name used to indicate a random access manner, and a specific name of the random access manner does not limit the scope of the embodiments of the application. In some scenarios, for example, in a conventional mobile broadband (MBB) service scenario, a wireless transmission service does not have a high requirement on a transmission delay. When a conventional terminal device in an idle (IDLE) state or an inactive (INACTIVE) state needs to initiate random access, the four-step random access is usually used.

Figure 3:
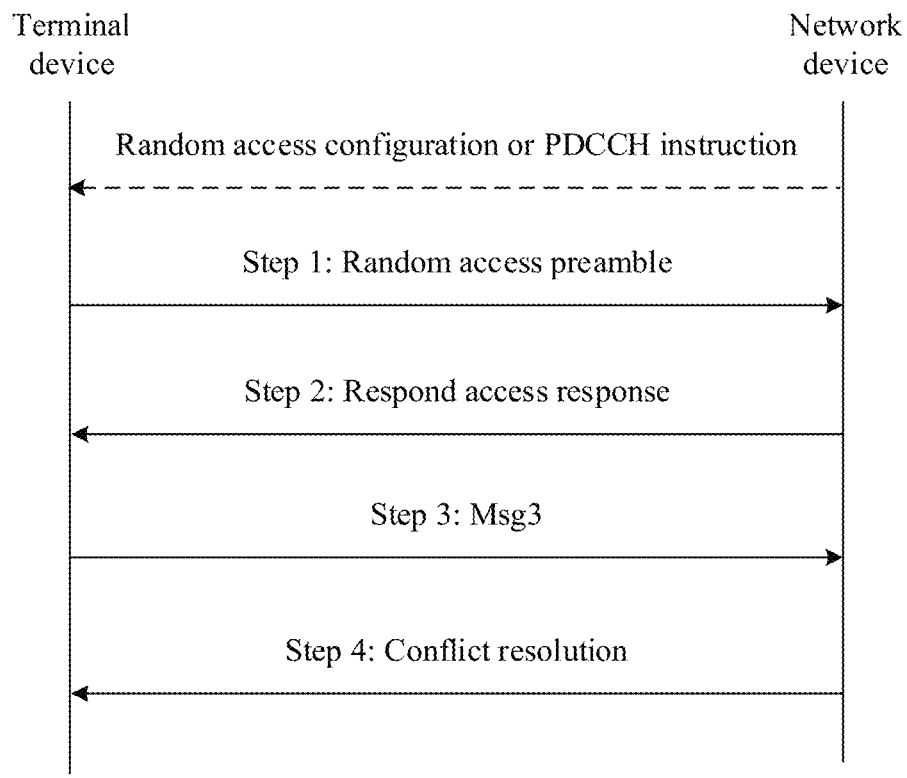
FIG. 3 is a schematic flowchart of a four-step random access procedure according to an embodiment of the application.

In the four-step random access procedure, four-step information exchange (a Msg1, a Msg2, a Msg3, and a Msg4) needs to be performed between a terminal device and a network device to complete the random access procedure. A basic procedure of the four-step random access procedure according to an embodiment of the application is shown in FIG. 3.

In an embodiment, before the four-step random access procedure, the network device may send random access configuration information (for example, carried in higher layer signaling) or a physical downlink control channel (PDCCH) to the device. This facilitates the terminal device to determine information such as an index, a time-frequency resource, and a power configuration of a random access preamble.

Step 1: The terminal device sends, to the network device, the random access preamble that is also referred to as a first message (Msg1). An objective of the random access preamble is to notify the network device that there is a random access request, so that the network device can estimate a transmission delay between the network device and the terminal device for uplink timing alignment.

Step 2: The network device sends, to the terminal device, a random access response (RAR) that is also referred to as a second message (Msg2). Specifically, after detecting the random access preamble, the network device sends the Msg2 to the terminal device. The Msg2 may include information such as the index of the random access preamble, a timing advance command, uplink resource allocation, and a cell radio network temporary identifier.

Step 3: The terminal device sends a third message (Msg3) to the network device. Specifically, after receiving the Msg2, the terminal device first adjusts uplink timing based on the timing advance command, and sends an uplink message on an allocated uplink resource based on an indication of the timing advance command, where the uplink message is also referred to as the Msg3. If a plurality of terminal devices select a same random access preamble in step 1, a collision occurs. For example, a random access preamble of one of the plurality of terminal devices is correctly received by the network device, the network device sends the Msg2 to the terminal device, and all the plurality of terminal devices may receive the Msg2. The plurality of terminal devices cannot determine, by using the Msg2, a specific terminal device whose random access preamble is received by the network device. In this case, all the terminal devices may receive the Msg2 and each send the Msg3. Therefore, the Msg3 includes a unique identifier of the terminal device, and is used to resolve a subsequent collision.

Step 4: The network device sends collision resolution to the terminal device. Specifically, the network device receives the Msg3 of the terminal device, and returns, to a terminal device that successfully accesses the network device, a collision resolution message that is also referred to as a fourth message (Msg4). The network device includes, in the collision resolution message, the unique identifier that is in the Msg3, to specify the terminal device that successfully accesses the network device, and other terminal devices that fail to access the network device initiate random access again.

2. Two-Step Random Access

With rapid development of ultra-reliable low-latency communication (URLLC), machine type communication (MTC), and the internet of things (IoT) in the future, sparse, small-packet, and reliable data transmission with a low-latency requirement has more application scenarios. To meet transmission of a data service of such a type, a delay introduced by multi-step interaction between a terminal device and a network device in four-step random access becomes a technical bottleneck. Therefore, a two-step random access is proposed. Similarly, the two-step random access is merely a name used to indicate a random access manner, and a specific name of the random access manner does not limit the scope of the embodiments of the application.

Figure 4:
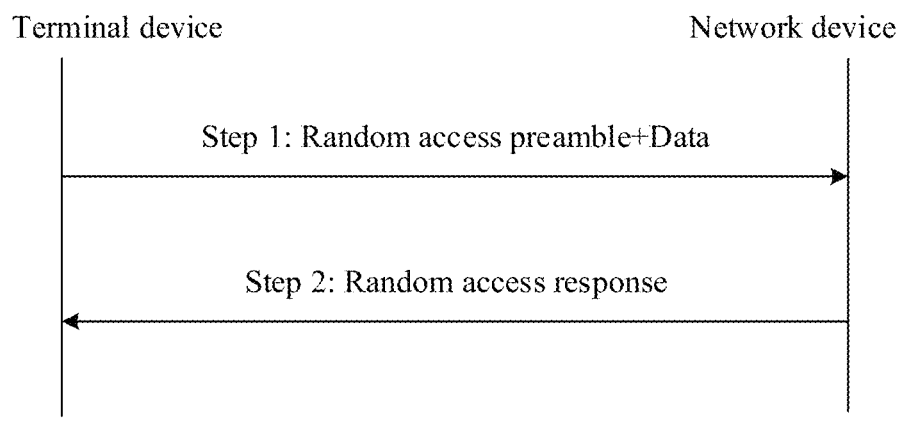
FIG. 4 is a schematic flowchart of a two-step random access procedure according to an embodiment of the application.

A main idea of two-step random access is to send uplink data in addition to the preamble in step 1. In an example, processes of step 1 and step 3 in the four-step random access procedure may be combined into step 1, and processes of step 2 and step 4 in the four-step random access procedure may be combined into step 2. A delay and signaling overheads can be reduced by using the two-step random access. FIG. 4 is a schematic diagram of two-step random access according to an embodiment of the application. As shown in FIG. 4, the two-step random access includes two steps.

Step 1: A terminal device sends a random access preamble and data to a network device, that is, the terminal device sends a MsgA to the network device, where the MsgA includes the random access preamble and the data.

Step 2: The terminal device receives a random access response of the network device, that is, the terminal device receives a response MsgB that is of the network device and that is to the MsgA, where response content of the MsgB may include a response to the preamble and/or a response to the data.

Figure 5:
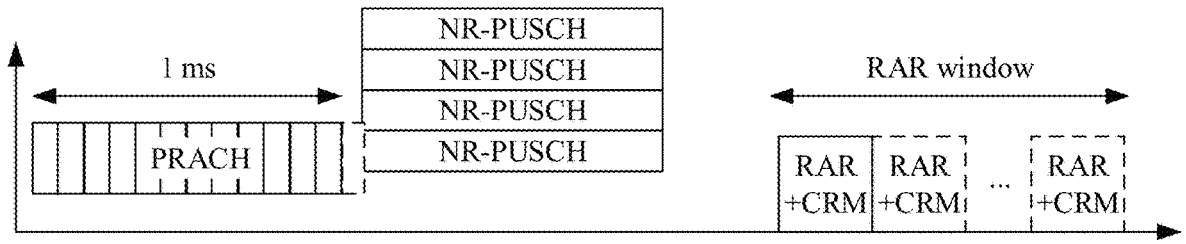
FIG. 5 is a schematic diagram of downlink response receiving based on a two-step random access procedure according to an embodiment of the application.

FIG. 5 is a schematic diagram of receiving a MsgB by a terminal device according to an embodiment of the application. As shown in FIG. 5, the MsgB includes two parts.

A first part is a RAR, in other words, a response to a preamble. The first part includes but is not limited to a timing advance (TA), a temporary cell radio network temporary identity (TC-RNTI), and an uplink (UL) grant.

A second part is contention resolution information (contention resolution message, CRM), and the second part includes but is not limited to identification information of the terminal device.

3. Time-Frequency Resource

In the embodiments of the application, data or information may be carried on a time-frequency resource, and the time-frequency resource may include a time domain resource and a frequency domain resource. In time domain, the time-frequency resource may include one or more time domain units (which may alternatively be referred to as time units). In frequency domain, the time-frequency resource may include a frequency domain unit.

A time domain unit (which may also be referred to as a time unit) may be a symbol, a mini-slot, a slot, or a subframe. Duration of a subframe in time domain may be 1 millisecond (ms). A slot includes seven or 14 symbols. A mini-slot may include at least one symbol (for example, two symbols, seven symbols, 14 symbols, or any quantity of symbols fewer than or equal to 14 symbols. The enumerated time domain unit sizes are merely intended to facilitate understanding of the solutions in the application, and should not be construed as a limitation on the application. It may be understood that the time domain unit sizes may be other values. This is not limited in the application.

A frequency domain unit may be a resource block (RB), a resource block group (BG), or a predefined subband.

In the embodiments of the application, the "data" or the "information" may be understood as a bit generated after an information block is coded, or may be understood as a modulation symbol generated after coded modulation is performed on an information block.

4. Repeated Transmission of Data

In a part of scenarios, for example, a scenario with a low latency and high reliability requirement, single transmission of data may not meet the high reliability requirement in the application scenario, and therefore, data needs to be repeatedly transmitted.

In a conventional technology, a quantity of repeated transmissions of data usually needs to be notified by a network device to a terminal device.

The four-step random access shown in FIG. 3 is used as an example. In the four-step random access, the preamble and the data each are repeatedly transmitted. In addition, in the four-step random access, the data is transmitted on a resource configured based on an uplink scheduling grant in step 2 after the network device determines that the preamble is successfully detected.

The network device notifies the terminal device to perform repeated transmission. Consequently, not only signaling overheads are increased, but also a transmission delay is increased.

In view of this, the application provides a data sending method, so that the terminal device can flexibly select the quantity of repeated transmissions of the data, thereby improving data transmission reliability, and reducing signaling overheads caused by scheduling by the network device.

The following describes in detail various embodiments provided in the application with reference to the accompanying drawings.

Figure 6:
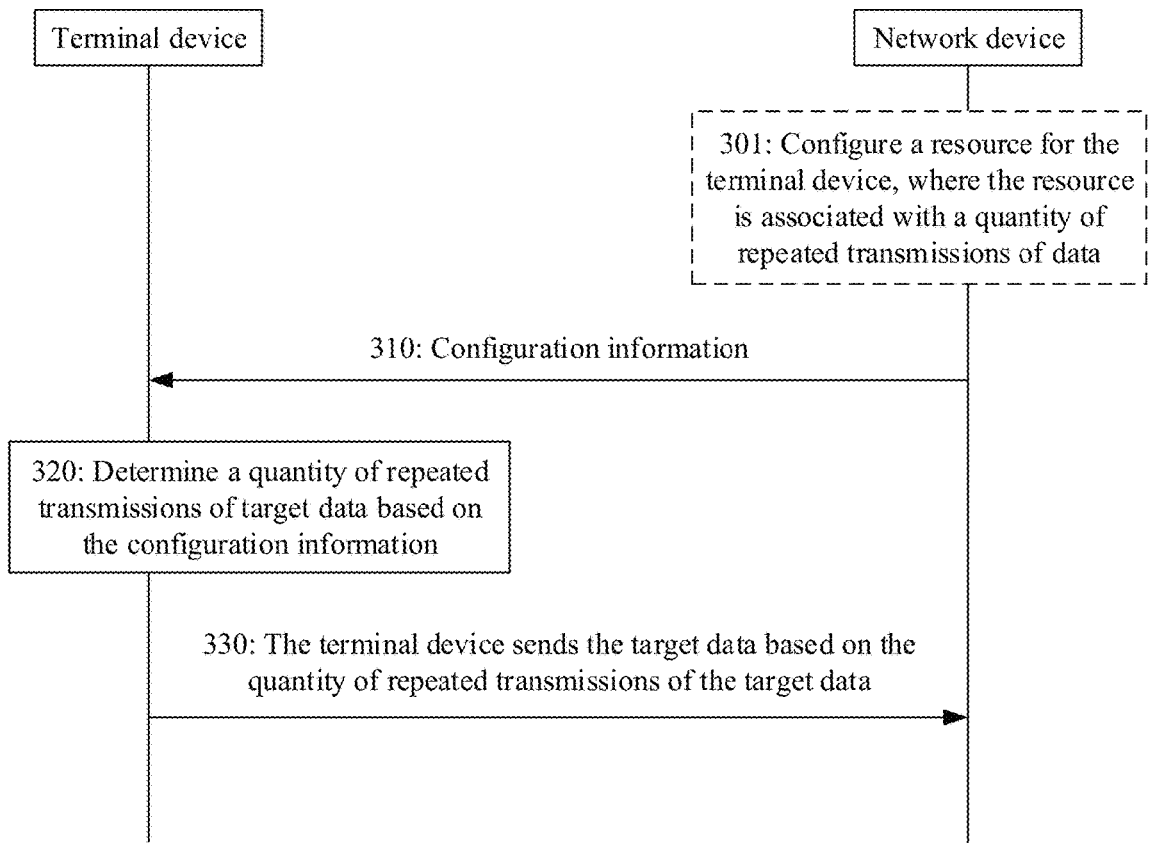
FIG. 6 is a schematic interaction diagram of a data sending method according to an embodiment of the application.

FIG. 6 is a schematic interaction diagram of a data sending method 300 according to an embodiment of the application. The method 300 may include the following operations.

310: A terminal device receives configuration information. Correspondingly, a network device sends the configuration information to the terminal device.

The configuration information may include configuration information related to data transmission, for example, includes resource configuration information and power configuration information. The configuration information may include but is not limited to one or more of the following: a time-frequency resource used for the data transmission, a port of a demodulation reference signal (DMRS), a port group to which a port used for demodulating a DMRS of data belongs, a receive power, a maximum transmit power of the terminal device, a candidate quantity of repeated transmissions, a transmit power threshold, a preamble resource corresponding to the data transmission, and the like.

It should be understood that the network device may notify the terminal device of the configuration information by using one piece of signaling (for example, higher layer signaling). The configuration information includes the resource configuration information and the power configuration information. Alternatively, the network device may notify the terminal device of the power configuration information by using one piece of signaling. In an embodiment, the network device may further notify the terminal device of the resource configuration information by using another piece of signaling. A quantity of pieces of signaling used to notify the terminal device of the configuration information is not limited in the application.

In an embodiment, the receive power may be a receive power of to-be-transmitted data. Alternatively, the receive power may be a receive power configured by the network device for the terminal device in a historical communication process, a receive power configured by the network device for another terminal device communicating with the network device, or the like. This is not limited herein. For differentiation, in an embodiment of the application, the to-be-transmitted data is denoted as target data, and the receive power of the to-be-transmitted data is denoted as a target receive power. In the following embodiment, an example in which the receive power is a target power is used for description.

For example, the target data may be a PUSCH, for example, a PUSCH carried in a MsgA in a two-step random access procedure. The target data mentioned in an embodiment of the application may be replaced with the PUSCH.

In an embodiment, the transmit power threshold may indicate a threshold related to a transmit power of the terminal device. The transmit power threshold may be used by the terminal device to determine a quantity of repeated transmissions of data, and may further be used by the terminal device to determine an actual transmit power of the terminal device.

It should be understood that the transmit power threshold is merely a name for differentiation, and does not limit the protection scope of an embodiment of the application. The transmit power threshold is used below.

For the transmit power threshold, at least the following four solutions are included.

Solution 1: The terminal device calculates the transmit power threshold, determines the quantity of repeated transmissions of data based on the transmit power threshold obtained through calculation, and may also determine the actual transmit power of the terminal device.

Solution 2: The network device calculates the transmit power threshold, and sends the transmit power threshold to the terminal device. The terminal device determines the quantity of repeated transmissions of data based on the received transmit power threshold, and may also determine the actual transmit power of the terminal device.

Solution 3: The transmit power threshold is predefined.

In solution 3, the transmit power threshold may be a pre-stipulated threshold, for example, pre-stipulated by the network device or pre-stipulated in a protocol. The predefined transmit power threshold may be sent by the network device to the terminal device, or may be prestored by the terminal device. This is not limited.

Solution 4: The transmit power threshold is a historical transmit power threshold.

In solution 4, the transmit power threshold may be a threshold determined based on historical communication. For example, the transmit power threshold may be a threshold configured by the network device for the terminal device in a previous communication process, and the network device sends the threshold to the terminal device. For another example, the transmit power threshold may be a threshold obtained by the terminal device through calculation in a previous communication process, and the terminal device determines the quantity of repeated transmissions of data and the actual transmit power of the terminal device based on the transmit power threshold.

The following describes in detail a method for calculating a transmit power threshold in the foregoing solution 1 and solution 2.

In an embodiment, before operation 310, the method 300 may further include operation 301.

301: The network device configures a resource for the terminal device, where the resource is associated with the quantity of repeated transmissions of data.

For example, the network device configures a plurality of resources for the terminal device, and each resource corresponds to one quantity of repeated transmissions.

The following describes in detail an association relationship between a resource and a quantity of repeated transmissions of data.

320: The terminal device determines a quantity of repeated transmissions of the target data based on the configuration information.

In an embodiment of the application, the terminal device may flexibly select the quantity of repeated transmissions of data based on an actual situation, so that not only data transmission performance can be improved, but also signaling overheads caused by scheduling by the network device can be reduced.

The terminal device may determine the quantity of repeated transmissions of the target data by considering at least the following two cases.

Case 1: The configuration information includes the transmit power threshold, and the terminal device determines the quantity of repeated transmissions of the target data based on the transmit power threshold.

Case 2: The configuration information includes the target receive power, and the terminal device determines the quantity of repeated transmissions of the target data based on the target receive power.

The foregoing two cases are described in detail below.

330: The terminal device sends the target data to the network device based on the quantity of repeated transmissions of the target data.

That the terminal device sends the target data to the network device based on the quantity of repeated transmissions of the target data may indicate that a quantity of times that the terminal device sends the target data to the network device is less than or equal to the quantity of repeated transmissions of the target data. For example, the following two cases may be included.

In a possible case, the quantity of times that the terminal device sends the target data to the network device is equal to the quantity of times that the target data is repeatedly sent.

In another possible case, the quantity of times that the terminal device sends the target data to the network device is less than the quantity of times that the target data is repeatedly transmitted and sent. For example, before sending the target data for the last time, the terminal device determines that the network device has successfully received the target data.

In an embodiment, if the terminal device receives acknowledgement response information for the target data when a quantity of transmissions of the target data does not reach the quantity of repeated transmissions of the target data, the terminal device stops sending the target data. In other words, when the terminal device determines that the network device successfully receives the data, the terminal device may interrupt remaining unfinished repeated transmission of the data.

For example, assuming that the quantity that is of repeated transmissions of the target data and that is determined by the terminal device is K, after the terminal device completes sending the target data for an $i^{th}$ time (where i is less than K), the terminal device receives response information, for example, hybrid automatic repeat request (HARQ)-acknowledgement (ACK) information, sent by the network device for the target data. The HARQ-ACK information indicates that the target data is successfully received. In this case, the terminal device stops sending the target data, to reduce signaling overheads and save resources.

For another example, the terminal device receives response information that corresponds to the MsgA, that is scheduled by using a PDCCH, and that is sent by the network device. When the terminal device detects a matched preamble index number and a matched contention resolution ID in the response information, the terminal device determines that the MsgA is successfully sent. In this case, the terminal device stops sending the target data.

For another example, it is assumed that the terminal device receives response information, for example, HARQ-negative acknowledgement (NACK) (HARQ-NACK) information, sent by the network device for the target data. The HARQ-NACK information indicates that the target data is not successfully received. In this case, the terminal device continues to send the target data, to ensure reliable data transmission.

It should be understood that there are many methods used by the terminal device to determine whether the network device successfully receives the data. This is not limited in the application. Any method in which the terminal device can determine whether the network device successfully receives or fails to receive the data falls within the protection scope of an embodiment of the application.

In an embodiment, a time interval between receiving the response information by the terminal device and determining, by the terminal device, that the data is successfully sent is t, and t may be a value greater than or equal to 0. t may be a pre-stipulated value, for example, predefined in a protocol or by the network device; or may be a value configured by the network device for the terminal device, for example, a value configured based on a data processing capability of the terminal device. This is not limited herein.

In an embodiment, the terminal device monitors the response information for the target data in a response time window.

For example, the response time window may be a time window configured by the network device for the terminal device. For example, the response time window may include duration and/or a start location of the time window. For another example, the response time window may alternatively be a pre-stipulated time window, and duration and/or a start location of the time window may both be pre-stipulated, for example, stipulated in a protocol.

It is assumed that the network device configures the response time window, and a two-step random access procedure is used as an example.

For example, the network device may configure, for the terminal device, a response time window used to monitor response information MsgB corresponding to the MsgA. The response time window may be one time window. In the time window, response information corresponding to a preamble in the MsgA and response information corresponding to the PUSCH in the MsgA may be monitored simultaneously. Duration and/or a start location of the time window may be pre-stipulated, or may be configured by the network device.

For example, the network device may configure, for the terminal device, a response time window used to monitor response information MsgB corresponding to the MsgA. The response time window may be two time windows that are denoted as a first time window and a second time window for differentiation. The terminal device may monitor, in the first time window, response information corresponding to a preamble in the MsgA, and the terminal device may monitor, in the second time window, response information corresponding to the PUSCH in the MsgA. Duration of the first time window and the second time window may be the same or different, and start locations of the first time window and the second time window may be the same or different. The duration and/or start locations of the first time window and the second time window may be pre-stipulated, or may be configured by the network device.

In an embodiment, the start location of the response time window may be a location at which the terminal device sends the target data for an $m^{th}$ time, where m is greater than 0 or equal to 0, and m is less than or equal to the quantity of repeated transmissions of the target data. In other words, after sending the target data for an $m^{th}$ time, the terminal device starts to monitor the response information for the target data. When m=0, it indicates that when the terminal device starts to send the target data for the first time, the terminal device starts to monitor the response information for the target data.

It should be understood that, that the terminal device sends the target data for an $m^{th}$ time may indicate that the terminal device starts to monitor the response information for the target data after sending the target data for the $m^{th}$ time, or may indicate that the terminal device starts to monitor the response information for the target data when starting to send the target data for the $m^{th}$ time, or may indicate that the terminal device starts to monitor the response information for the target data in a process in which the terminal device starts to send the target data for the $m^t$ time. This is not strictly limited.

In an embodiment, the start location of the response time window may be the first location that can be used to monitor a corresponding physical downlink control channel (PDCCH) after the terminal device sends the target data for an $n^{th}$ time, where n is greater than 0 or equal to 0, and n is less than or equal to the quantity of repeated transmissions of the target data.

Solution 1 and solution 2 mentioned in operation 310 are described in detail below.

Methods for calculating a transmit power threshold by the terminal device and the network device are similar. For ease of understanding, an example in which the terminal device calculates the transmit power threshold is used for description herein.

In an embodiment, the transmit power threshold may be obtained through calculation based on the following parameters: the target receive power, a path loss value obtained by the terminal device through measurement, and a parameter related to the transmit power of the terminal device.

The path loss value obtained by the terminal device through measurement is, for example, a path loss value obtained by the terminal device through measurement based on a downlink reference signal. A measurement method is not limited in an embodiment of the application. For example, measurement may be performed based on an existing solution.

The parameter related to the transmit power of the terminal device may include, for example, an impact factor for determining the transmit power of the terminal device, including but not limited to one or more of the following factors: a bandwidth factor, a modulation and coding scheme (MCS) factor, a closed-loop power control adjustment factor, an asynchronous transmission impact factor, and the like.

In an embodiment, the transmit power threshold is a sum of values of the following three parameters: the target receive power, the path loss value obtained by the terminal device through measurement, and the parameter related to the transmit power of the terminal device.

That is, the transmit power threshold may be obtained according to the following formula:

$$T = P4 + P5 + P6 \quad \text{Formula 1,}$$

where

T represents the transmit power threshold, P4 represents the target receive power, P5 represents the path loss value obtained by the terminal device through measurement, and P6 represents the parameter related to the transmit power of the terminal device.

It should be understood that a formula similar to formula 1 or a variation formula derived from formula 1 falls within the protection scope of an embodiment of the application.

It should be further understood that the network device may alternatively determine the transmit power threshold based on the foregoing parameters, or according to the foregoing formula 1, or according to the variation formula derived from the foregoing formula 1.

Case 1 and case 2 mentioned in operation 320 are described in detail below.

Case 1: The configuration information includes the transmit power threshold, and the terminal device determines the quantity of repeated transmissions of the target data based on the transmit power threshold.

The network device may determine the transmit power threshold based on any one of solution 2, solution 3, or solution 4 in operation 310, and send the transmit power threshold to the terminal device. The terminal device determines the quantity of repeated transmissions of the target data based on the transmit power threshold.

In an embodiment, the terminal device may determine the quantity of repeated transmissions of the target data based on one or more of the following parameters: the candidate quantity of repeated transmissions, a repeated transmission gain adjustment factor, the maximum transmit power of the terminal device, or the transmit power threshold.

The candidate quantity of repeated transmissions may be preconfigured by the network device for the terminal device.

For example, the quantity of repeated transmissions of the target data may satisfy any one of the following formulas:

$$P1 + P2 \cdot 10 \cdot \log_{10} K \geq T, \text{ and } P1_{max} \geq P1 \quad \text{Formula 2}$$

$$P1 + P2 \cdot 10 \cdot \log_{10} K \geq T, K \geq K_{CElevel,min}, \text{ and } P1_{max} \geq P1 \quad \text{Formula 3}$$

$$P1 + (i-1) \cdot P3 + P2 \cdot 10 \cdot \log_{10} K \geq T, \text{ and } P1_{max} \geq P1 \quad \text{Formula 4}$$

$$P1 + (i-1) \cdot P3 + P2 \cdot 10 \cdot \log_{10} K_{CElevel,min}, \text{ and } P1_{max} \geq P1 \quad \text{Formula 5,}$$

where

T indicates the transmit power threshold; P1 indicates the transmit power of the terminal device, in other words, an actual transmit power at which the terminal device sends the target data; $P1_{max}$ indicates the maximum transmit power of the terminal device; P2 indicates the repeated transmission gain adjustment factor; P3 indicates a power increment step; K indicates the quantity of repeated transmissions of the target data; i indicates that the terminal device sends the target data for an $i^{th}$ time, where i=1, 2, . . . , K; and $K_{CElevel,min}$ indicates a minimum quantity of repeated transmissions corresponding to the terminal device at different coverage levels (CE levels), and $K \geq K_{CElevel,min}$.

The terminal device may determine the quantity of repeated transmissions of the target data based on at least any one of the following implementations.

Implementation 1: The terminal device may select, according to any one of the foregoing formulas, a minimum value that is of K and that satisfies the formula as the quantity of repeated transmissions of the target data. In addition, the terminal device may determine the transmit power P1 of the terminal device.

Implementation 2: The terminal device substitutes $P1 = P1_{max}$ into any one of the foregoing formulas, determines K, and determines whether K belongs to the candidate quantity of repeated transmissions. If K belongs to the candidate quantity of repeated transmissions, the terminal device determines that K is the quantity of repeated transmissions of the target data, and may determine that the actual transmit power of the terminal device is the maximum transmit power of the terminal device.

Implementation 3: The terminal device selects a minimum value (e.g., a minimum quantity) in the candidate quantity of repeated transmissions, substitutes the value into any one of the foregoing formulas, and determines whether P1 is less than or equal to $P1_{max}$. If P1 is less than or equal to $P1_{max}$, the minimum quantity in the candidate quantity of repeated transmissions is determined as the quantity of repeated transmissions of the target data, and the actual transmit power of the terminal device may be determined as, for example, a smallest value or any value that is of P1 and that satisfies the formula.

Implementation 4: The terminal device selects any value in the candidate quantity of repeated transmissions, substitutes the value into any one of the foregoing formulas, and determines whether P1 is less than or equal to $P1_{max}$. If P1 is less than or equal to $P1_{max}$, the value selected by the terminal device is determined as the quantity of repeated transmissions of the target data, and the actual transmit power of the terminal device may be determined as, for example, a smallest value or any value that is of P1 and that satisfies the formula.

Implementation 5: The terminal device selects any P1 less than $P1_{max}$, and selects, from the candidate quantity of repeated transmissions, a smallest or a largest quantity of repeated transmissions that satisfies any one of the foregoing formulas as the quantity of repeated transmissions of the target data. In addition, the selected P1 is the transmit power of the terminal device.

It should be understood that the foregoing several implementations are merely examples for ease of understanding. An embodiment of the application is not limited thereto. Any manner in which the quantity of repeated transmissions of the target data may be determined according to any one of the foregoing formulas falls within the protection scope of an embodiment of the application. It should be noted that the network device may not configure the candidate quantity of repeated transmissions for the terminal device. In this case, the terminal device selects a quantity of transmissions from quantities of transmissions that satisfy the foregoing formula as the quantity of repeated transmissions of the target data.

It should be further understood that the foregoing formula 2 to formula 5 are merely examples for description. The application is not limited thereto. For example, a variation formula derived from the foregoing formula 2 to formula 5 falls within the protection scope of an embodiment of the application.

It should be further understood that the foregoing formula 2 to formula 5 may be applied to any scenario. The application is not limited thereto. For example, the foregoing formula 4 and formula 5 may be applied to a MsgA retransmission scenario in a secondary random access procedure, and the foregoing formula 2 and formula 3 may be applied to a MsgA initial transmission scenario. For another example, all the foregoing formula 2 to formula 5 may be applied to a MsgA initial transmission scenario or a MsgA retransmission scenario. For another example, the foregoing formula 3, formula 4, and formula 5 may be applied to a MsgA retransmission scenario in a secondary random access procedure, and the foregoing formula 2 may be applied to a MsgA initial transmission scenario.

Case 2: The configuration information includes the target receive power, and the terminal device determines the quantity of repeated transmissions of the target data based on the target receive power.

The terminal device may determine the quantity of repeated transmissions of the target data based on the target receive power configured by the network device.

In an embodiment, the terminal device determines the quantity of repeated transmissions of the target data based on the target receive power configured by the network device and one or more of the following parameters: the transmit power of the terminal device, the maximum transmit power of the terminal device, the candidate quantity of repeated transmissions, the repeated transmission gain adjustment factor, the path loss value obtained by the terminal device through measurement, and the parameter related to the transmit power of the terminal device.

In an embodiment, the terminal device determines the quantity of repeated transmissions of the target data based on the transmit power threshold.

For example, the terminal device may first calculate the transmit power threshold based on the foregoing described method for calculating the transmit power threshold by the terminal device, for example, according to the foregoing formula 1, and then the terminal device determines the quantity of repeated transmissions of the target data according to any one of formula 2 to formula 5 in case 1 and any one of the implementations in case 1.

For details, refer to descriptions in the foregoing case 1. Details are not described herein again.

In an embodiment, the terminal device determines the quantity of repeated transmissions of the target data based on the target receive power and the foregoing parameters.

For example, the quantity of repeated transmissions of the target data may satisfy any one of the following formulas:

$$P1+P2\cdot 10\cdot \log_{10}K \geq P4+P5+P6, \text{ and } P1_{max} \geq P1 \quad \text{Formula 6}$$

$$P1+P2\cdot 10\cdot \log_{10}K \geq P4+P5+P6, K \geq K_{CElevel,min}, \text{ and } P1_{max} \geq P1 \quad \text{Formula 7}$$

$$P1+(i-1)\cdot P3+P2\cdot 10\cdot \log_{10}K \geq P4+P5+P6, \text{ and } P1_{max} \geq P1 \quad \text{Formula 8}$$

$$P1+(i-1)\cdot P3+P2\cdot 10\cdot \log_{10}K \geq P4+P5+ P6, K \geq K_{CElevel,min}, \text{ and } P1_{max} \geq P1 \quad \text{Formula 9,}$$

where

P1 indicates the transmit power of the terminal device, in other words, an actual transmit power at which the terminal device sends the target data. $P1_{max}$ indicates the maximum transmit power of the terminal device. P2 indicates a repeated transmission gain adjustment factor. P3 indicates a power increment step. P4 indicates the target receive power. P5 indicates the path loss value obtained by the terminal device through measurement. P6 indicates the parameter related to the transmit power of the terminal device. K indicates the quantity of repeated transmissions of the target data. i indicates that the terminal device sends the target data for an $i^{th}$ time, where i=1, 2, ..., K. $K_{CElevel,min}$ indicates a minimum quantity of repeated transmissions corresponding to the terminal device at different coverage levels, and $K \geq K_{CElevel,min}$.

The parameter related to the transmit power of the terminal device may include, for example, an impact factor for determining the transmit power of the terminal device, including but not limited to one or more of the following factors: a bandwidth factor, an MCS factor, a closed-loop power control adjustment factor, an asynchronous transmission impact factor, and the like.

The terminal device may determine the quantity of repeated transmissions of the target data based on at least any implementation in case 1. For brevity, details are not described herein again.

It should be understood that the foregoing formula 6 to formula 9 are merely examples for description, and the application is not limited thereto. For example, a variation formula derived from the foregoing formula 6 to formula 9 falls within the protection scope of an embodiment of the application. It should be noted that the network device may not configure the candidate quantity of repeated transmissions for the terminal device. In this case, the terminal device selects a quantity of transmissions from quantities of transmissions that satisfy the foregoing formula as the quantity of repeated transmissions of the target data.

It should be further understood that the foregoing formula 6 to formula 9 may be applied to any scenario. The application is not limited thereto. For example, the foregoing formula 8 and formula 9 may be applied to a MsgA retransmission scenario in a secondary random access procedure, and the foregoing formula 6 and formula 7 may be applied to a MsgA initial transmission scenario. For another example, all the foregoing formula 6 to formula 9 may be applied to a MsgA initial transmission scenario or a MsgA retransmission scenario. For another example, the foregoing formula 7, formula 8, and formula 9 may be applied to a MsgA retransmission scenario in a secondary random access procedure, and the foregoing formula 6 may be applied to a MsgA initial transmission scenario.

The foregoing describes in detail a manner in which the terminal device determines the quantity of repeated transmissions of the target data in operation 320. It should be understood that any manner in which the terminal device can determine the quantity of repeated transmissions of the target data falls within the protection scope of an embodiment of the application.

The following describes in detail the association relationship between a resource and a quantity of repeated transmissions of data mentioned in operation 301.

In an embodiment, the network device may preconfigure a plurality of resources for the terminal device, and each resource corresponds to one or more quantities of repeated transmissions. In this way, for the terminal device, after determining the quantity of repeated transmissions of the target data, the terminal device may also determine a corresponding resource. For the network device, the network device may determine the quantity of repeated transmissions of the target data, and further may better receive the target data based on the determined quantity of repeated transmissions of the target data.

It should be understood that "a quantity of repeated transmissions of data" and "a quantity of repeated transmissions of data" are used interchangeably. One of ordinary skill in the art may understand that, when differences are not emphasized, meanings to be expressed are consistent, and can be represented as a correspondence.

It should be further understood that, in an embodiment of the application, that the resource is associated with the quantity of repeated transmissions of data may also be understood as that the resource corresponds to the quantity of repeated transmissions of data. An association or correspondence form is not limited. For example, a representation form of the association between a resource and a quantity of repeated transmissions of data may be a form of a correspondence, a form of a table, a form in which the quantity of repeated transmissions of data is carried in a configuration of the resource, or the like. This is not limited.

The association relationship between a resource and a quantity of repeated transmissions may include at least the following several forms.

Form 1: In a random access procedure, one preamble group or one random access slot (PRACH occasion, RO) is associated with one quantity of repeated transmissions of data.

The preamble group is used as an example. In an embodiment, the network device configures one or more preamble groups for the terminal device, and each preamble group is associated with one quantity of repeated transmissions of data. In other words, different preamble groups correspond to different quantities of repeated transmissions of data.

For the terminal device, the terminal device may obtain the quantity of repeated transmissions of data through calculation based on any one of the foregoing implementations (e.g., the implementations in the foregoing case 1 and case 2). Then, the terminal device selects any preamble in a corresponding preamble group based on an association between a preamble group and a quantity of repeated transmissions of data, and sends the selected preamble to the network device.

It should be understood that the terminal device may select any preamble in a corresponding preamble group, or may select a preamble according to a preset rule. This is not limited. In the following embodiments, an example in which the terminal device selects any preamble in the corresponding preamble group is used for description.

For the network device, the network device may determine the quantity of repeated transmissions of data based on the preamble group in which the preamble is located and the association between a preamble group and a quantity of repeated transmissions of data.

An example is described with reference to FIG. 7.

Figure 7:
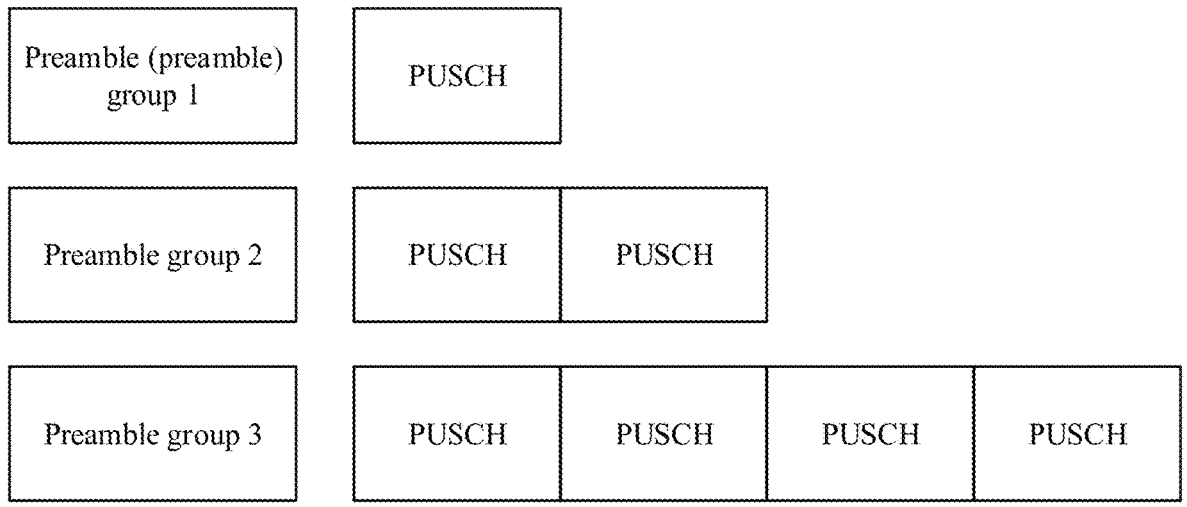
FIG. 7 to FIG. 11 are schematic diagrams of a mapping relationship between a resource and a quantity of repeated transmissions according to an embodiment of the application.

As shown in FIG. 7, three preamble groups are used as an example, and are denoted as a preamble group 1, a preamble group 2, and a preamble group 3 for differentiation. It is assumed that a quantity that is of repeated transmissions of data and that is associated with the preamble group 1 is 1, a quantity that is of repeated transmissions of data and that is associated with the preamble group 2 is 2, and a quantity that is of repeated transmissions of data and that is associated with the preamble group 3 is 4.

It should be understood that, in FIG. 7, one PUSCH indicates that a quantity of repeated transmissions of the data is 1, two PUSCHs indicate that a quantity of repeated transmissions of the data is 2, and four PUSCHs indicate that a quantity of repeated transmissions of the data is 4. Cases in the following figures are similar, and details are not described below.

For example, if the network device receives the preamble sent by the terminal device, and determines that the preamble is of preambles in the preamble group 1, the network device determines, based on the association relationship between a preamble group and a quantity of repeated transmissions of data, that the quantity of repeated transmissions of data is 1. For another example, if the network device receives the preamble sent by the terminal device, and determines that the preamble is of preambles in the preamble group 2, the network device determines, based on the association relationship between a preamble group and a quantity of repeated transmissions of data, that the quantity of repeated transmissions of data is 2. For another example, if the network device receives the preamble sent by the terminal device, and determines that the preamble is of preambles in the preamble group 3, the network device determines, based on the association relationship between a preamble group and a quantity of repeated transmissions of data, that the quantity of repeated transmissions of data is 4.

Form 2: In a random access procedure, one preamble group or one RO is associated with a plurality of quantities of repeated transmissions of data.

The preamble group is used as an example. In an embodiment, the network device configures one or more preamble groups for the terminal device, and each preamble group is associated with a plurality of quantities of repeated transmissions of data.

Form 2 may include the following plurality of implementations.

Manner 1: Different time-frequency resources are associated with different quantities of repeated transmissions of data.

In other words, one preamble group is associated with a plurality of quantities of repeated transmissions of data, and different quantities of repeated transmissions of data are associated with different time-frequency resources.

For the terminal device, the terminal device may obtain the quantity of repeated transmissions of data through calculation based on any one of the foregoing implementations (e.g., the implementations in the foregoing case 1 and case 2). Then, the terminal device selects any preamble in a corresponding preamble group based on an association relationship between a preamble group and a quantity of repeated transmissions of data, and sends the selected preamble to the network device.

In addition, the terminal device may determine the time-frequency resource based on an association relationship between a quantity of repeated transmissions of data and a time-frequency resource.

An example is described with reference to FIG. 8.

Figure 8:
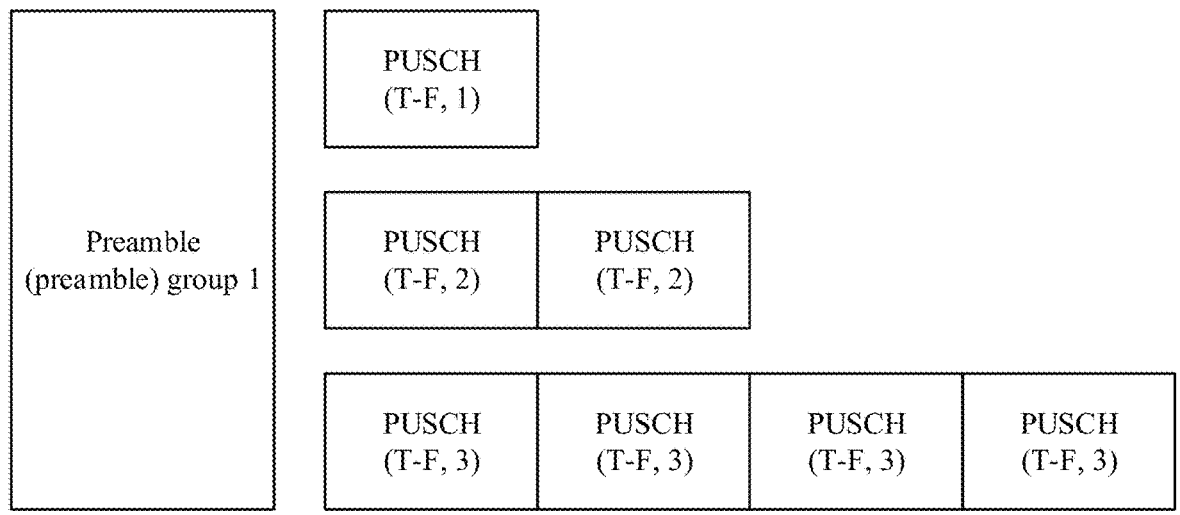

As shown in FIG. 8, one preamble group is used as an example, for example, denoted as a preamble group 1. It is assumed that quantities that are of repeated transmissions of data and that are associated with a preamble group are 1, 2, and 4, a quantity that is of repeated transmissions of data and that is associated with a time-frequency resource (T-F, 1) is 1, a quantity that is of repeated transmissions of data and that is associated with a time-frequency resource (T-F, 2) is 2, and a quantity that is of repeated transmissions of data and that is associated with a time-frequency resource (T-F, 3) is 4. It is assumed that after determining that the quantity of repeated transmissions of data is 4, and the preamble group is the preamble group 1, the terminal device may determine that the time-frequency resource for the data transmission is (T-F, 3).

For the network device, the network device determines a preamble group in which the preamble is located, determines, through blind detection, a time-frequency resource for the data transmission, and then determines the quantity of repeated transmissions of data based on the association relationship between a quantity of repeated transmissions of data and a time-frequency resource.

An example is still described with reference to FIG. 8. For example, the network device receives the preamble sent by the terminal device, and determines that the preamble is of preambles in the preamble group 1. Then, the network device determines, through blind detection, that the time-frequency resource for the data transmission is (T-F, 2), and the network device determines, based on the association relationship between a quantity of repeated transmissions of data and a time-frequency resource, that the quantity of repeated transmissions of data is 2. For another example, the network device receives the preamble sent by the terminal device, and determines that the preamble is of the preambles in the preamble group 1. Then, the network device determines, through blind detection, that the time-frequency resource for the data transmission is (T-F, 3), and the network device determines, based on the association relationship between a quantity of repeated transmissions of data and a time-frequency resource, that the quantity of repeated transmissions of data is 4.

Therefore, when the time-frequency resource is associated with the quantity of repeated transmissions of data, the terminal device may determine, based on the quantity of repeated transmissions of data obtained through calculation and the association relationship between a quantity of repeated transmissions of data and a time-frequency resource, the time-frequency resource for the data transmission. The network device may determine, through blind detection, the time-frequency resource for the data transmission, and determines the quantity of repeated transmissions of data based on the association relationship between a quantity of repeated transmissions of data and a time-frequency resource.

Manner 2: Different DMRS ports are associated with different quantities of repeated transmissions of data.

In other words, one preamble group is associated with a plurality of quantities of repeated transmissions of data, and different quantities of repeated transmissions of data are associated with different DMRS ports.

For the terminal device, the terminal device may obtain the quantity of repeated transmissions of data through calculation based on any one of the foregoing implementations (e.g., the implementations in the foregoing case 1 and case 2). Then, the terminal device selects any preamble in a corresponding preamble group based on the association relationship between a preamble group and a quantity of repeated transmissions of data, and sends the selected preamble to the network device.

In addition, the terminal device may determine a DMRS port based on an association relationship between a quantity of repeated transmissions of data and a DMRS port.

An example is described with reference to FIG. 9.

Figure 9:
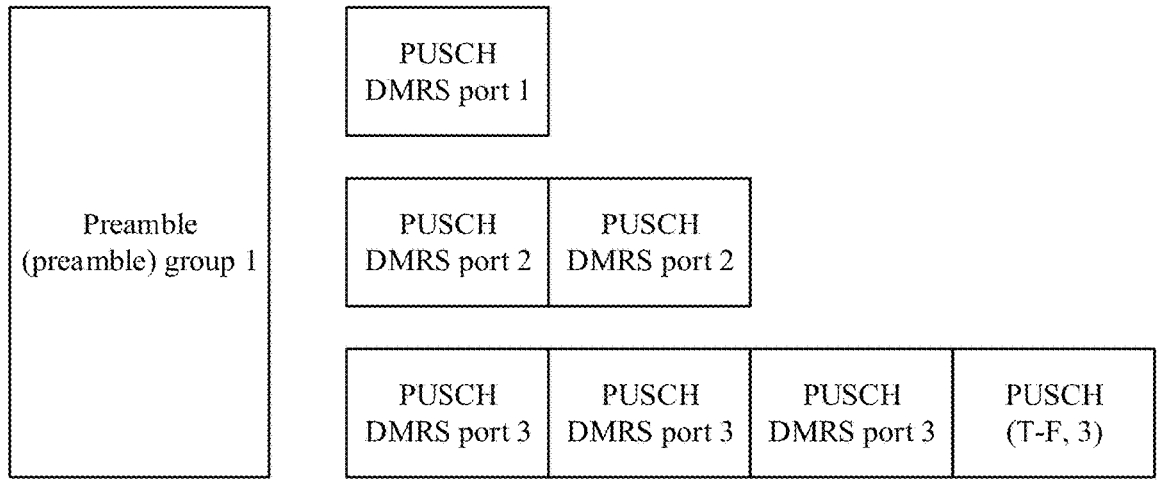

As shown in FIG. 9, one preamble group is used as an example, for example, denoted as a preamble group 1. It is assumed that quantities that are of repeated transmissions of data and that are associated with a preamble group are 1, 2, and 4, a quantity that is of repeated transmissions of data and that is associated with a DMRS port 1 is 1, a quantity that is of repeated transmissions of data and that is associated with a DMRS port 2 is 2, and a quantity that is of repeated transmissions of data and that is associated with a DMRS port 3 is 4. It is assumed that after determining that the quantity of repeated transmissions of data is 4 and the preamble group is the preamble group 1, the terminal device may determine that a DMRS port is the DMRS port 2.

For the network device, the network device determines a preamble group in which the preamble is located, and determines the quantity of repeated transmissions of data based on a DMRS port and the association relationship between a quantity of repeated transmissions of data and a DMRS port.

An example is still described with reference to FIG. 9. For example, the network device receives the preamble sent by the terminal device, and determines that the preamble is of preambles in the preamble group 1. Then, the network device determines that the DMRS port is the DMRS port 2, and the network device determines, based on the association relationship between a quantity of repeated transmissions of data and a DMRS port, that the quantity of repeated transmissions of data is 2. For another example, the network device receives the preamble sent by the terminal device, and determines that the preamble is of preambles in the preamble group 1. Then, the network device determines that the DMRS port is the DMRS port 3, and the network device determines, based on the association relationship between a quantity of repeated transmissions of data and a DMRS port, that the quantity of repeated transmissions of data is 4.

Therefore, when the DMRS port is associated with the quantity of repeated transmissions of data, the terminal device may determine, based on the quantity of repeated transmissions of data obtained through calculation and the association relationship between a quantity of repeated transmissions of data and a DMRS port, a DMRS port for the data transmission. The network device determines the DMRS port, and determines the quantity of repeated transmissions of data based on the association relationship between a quantity of repeated transmissions of data and a DMRS port.

It should be understood that, in Manner 2, a port group in which the DMRS port is located may alternatively be associated with the quantity of repeated transmissions of data.

Manner 3: Different CE levels are associated with different quantities of repeated transmissions of data.

In other words, one preamble group is associated with a plurality of quantities of repeated transmissions of data, and different quantities of repeated transmissions of data are associated with different CE levels.

For the terminal device, the terminal device may obtain the quantity of repeated transmissions of data through calculation based on any one of the foregoing implementations (e.g., the implementations in the foregoing case 1 and case 2). Then, the terminal device selects any preamble in a corresponding preamble group based on the association relationship between a preamble group and a quantity of repeated transmissions of data, and sends the selected preamble to the network device.

In addition, different CE levels may be further associated with different time-frequency resources and/or DMRS ports. Therefore, the terminal device may also determine a time-frequency resource and/or a DMRS port based on an association relationship between a quantity of repeated transmissions of data and a CE level.

Figure 10:
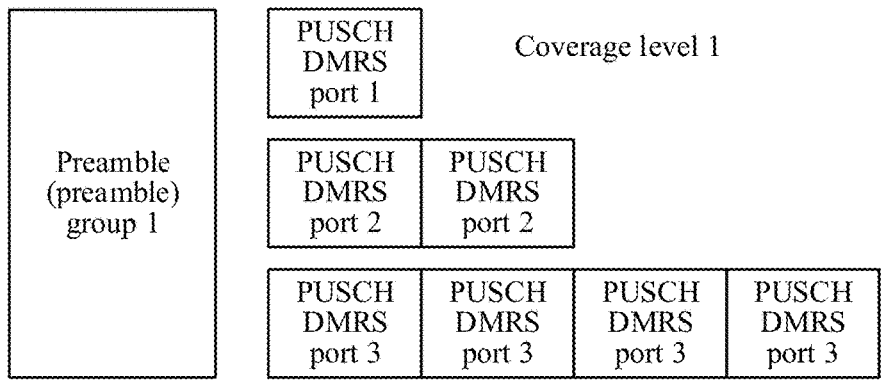
Figure 10:
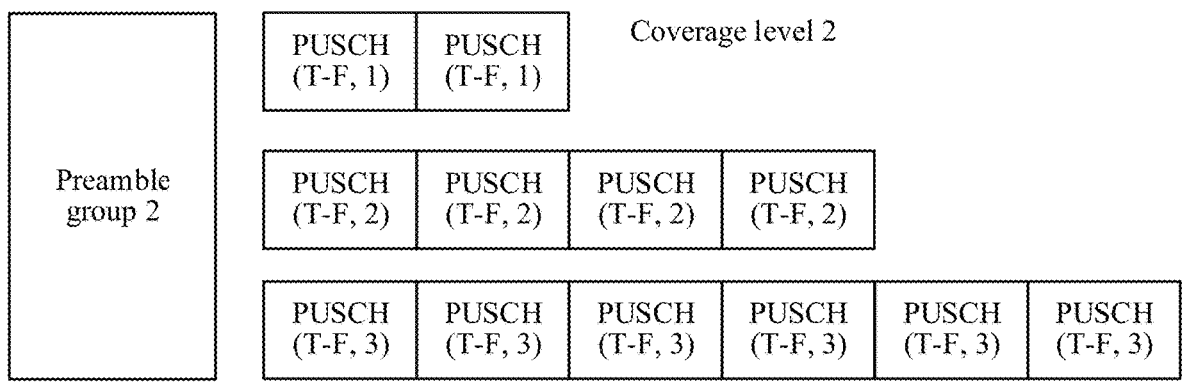

An example is described with reference to FIG. 10.

The DMRS port is used as an example. As shown in FIG. 10, two preamble groups are used as an example, and are denoted as a preamble group 1 and a preamble group 2 for differentiation. It is assumed that quantities that are of repeated transmissions of data and that are associated with the preamble group 1 are 1, 2, and 4, a quantity that is of repeated transmissions of data and that is associated with a DMRS port 1 is 1, a quantity that is of repeated transmissions of data and that is associated with a DMRS port 2 is 2, a quantity that is of repeated transmissions of data and that is associated with a DMRS port 3 is 4, and a CE level associated with the preamble group 1 is a CE level 1; and quantities that are of repeated transmissions of data and that are associated with the preamble group 2 are 2, 4, and 6, a quantity that is of repeated transmissions of data and that is associated with a time-frequency resource (T-F, 1) is 2, a quantity that is of repeated transmissions of data and that is associated with a time-frequency resource (T-F, 2) is 4, a quantity that is of repeated transmissions of data and that is associated with a time-frequency resource (T-F, 3) is 6, and a CE level associated with the preamble group 2 is a CE level 2.

It is assumed that the terminal device determines that a CE level is the CE level 1. For example, the terminal device may determine, based on a reference signal received power (RSRP) delivered by the network device and an RSRP calculated by the terminal device, a CE level that the terminal device is in. A manner in which the terminal device determines the CE level is not limited in an embodiment of the application. For example, refer to a manner in a conventional technology. Then, the terminal device may determine that a preamble group is the preamble group 1, may select any preamble in the preamble group 1, and may send the preamble to the network device. In addition, the terminal device may also determine a corresponding DMRS port based on the quantity of repeated transmissions of data obtained through calculation. For example, if the terminal device obtains, through calculation, that the quantity of repeated transmissions of data is 2, the terminal device determines that the DMRS port is the DMRS port 2.

For the network device, the network device determines a preamble group in which the preamble is located, and determines the quantity of repeated transmissions of data based on a time-frequency resource and/or a DMRS port and the association relationship between a quantity of repeated transmissions of data and a CE level.

An example is still described with reference to FIG. 10. For example, the network device receives the preamble sent by the terminal device, and determines that the preamble is of preambles in the preamble group 1. Then, the network device determines that the DMRS port is the DMRS port 2, and the network device determines, based on the association relationship between a quantity of repeated transmissions of data and a DMRS port, that the quantity of repeated transmissions of data is 2. For another example, the network device receives the preamble sent by the terminal device, and determines that the preamble is of preambles in the preamble group 1. Then, the network device determines that the DMRS port is the DMRS port 3, and the network device determines, based on the association relationship between a quantity of repeated transmissions of data and a DMRS port, that the quantity of repeated transmissions of data is 4.

It should be understood that, in Manner 3, a CE level may also be associated with a DMRS port and/or a time-frequency resource, and the terminal device may further determine the time-frequency resource and/or the DMRS port based on the quantity of repeated transmissions of data obtained through calculation and the association relationship between a quantity of repeated transmissions of data and a CE level.

The foregoing describes several implementations in Form 2. This is not limited in an embodiment of the application. For example, any manner in which the network device may determine the quantity of repeated transmissions of data based on the association relationship between a preamble group and a quantity of repeated transmissions of data and an association relationship between a quantity of repeated transmissions of data and a transmission parameter falls within the protection scope of an embodiment of the application. Alternatively, any manner in which the terminal device may determine, based on the association relationship between a preamble group and a quantity of repeated transmissions of data and an association relationship between a quantity of repeated transmissions of data and a transmission parameter, a resource for the data transmission, and a preamble falls within the protection scope of an embodiment of the application.

Form 3: A transmission parameter is associated with the quantity of repeated transmissions of data.

A transmission parameter indicates a parameter related to the data transmission, for example, including but not limited to a time-frequency resource, a DMRS port, a port group to which the DMRS port belongs, a beam, and the like that are for the data transmission.

A plurality of different implementations are included based on different transmission parameters.

Manner A: Different time-frequency resources are associated with different quantities of repeated transmissions of data.

For the terminal device, the terminal device may obtain the quantity of repeated transmissions of data through calculation based on any one of the foregoing implementations (e.g., the implementations in the foregoing case 1 and case 2). Then, the time-frequency resource for the data transmission is determined based on an association relationship between a time-frequency resource and a quantity of repeated transmissions of data.

For the network device, the network device may determine, through blind detection, the time-frequency resource for the data transmission, and then determines the quantity of repeated transmissions of data based on the association relationship between a quantity of repeated transmissions of data and a time-frequency resource.

Manner B: Different DMRS ports are associated with different quantities of repeated transmissions of data.

For the terminal device, the terminal device may obtain the quantity of repeated transmissions of data through calculation based on any one of the foregoing implementations (e.g., the implementations in the foregoing case 1 and case 2). Then, the DMRS port is determined based on an association relationship between a DMRS port and a quantity of repeated transmissions of data.

For the network device, the network device may determine the quantity of repeated transmissions of data based on a DMRS port and the association relationship between a quantity of repeated transmissions of data and a DMRS port.

Manner C: Different DMRS ports are associated with different quantities of repeated transmissions of data.

Different CE levels correspond to different time-frequency resources, time-frequency resources correspond to a plurality of quantities of repeated transmissions of data, and a unique quantity of repeated transmissions of data may be determined for each block of time-frequency resources by using an orthogonal DMRS port. The network device may determine the quantity of repeated transmissions of data based on the DMRS port and the time-frequency resource through blind detection.

An example is described with reference to FIG. 11.

Figure 11:
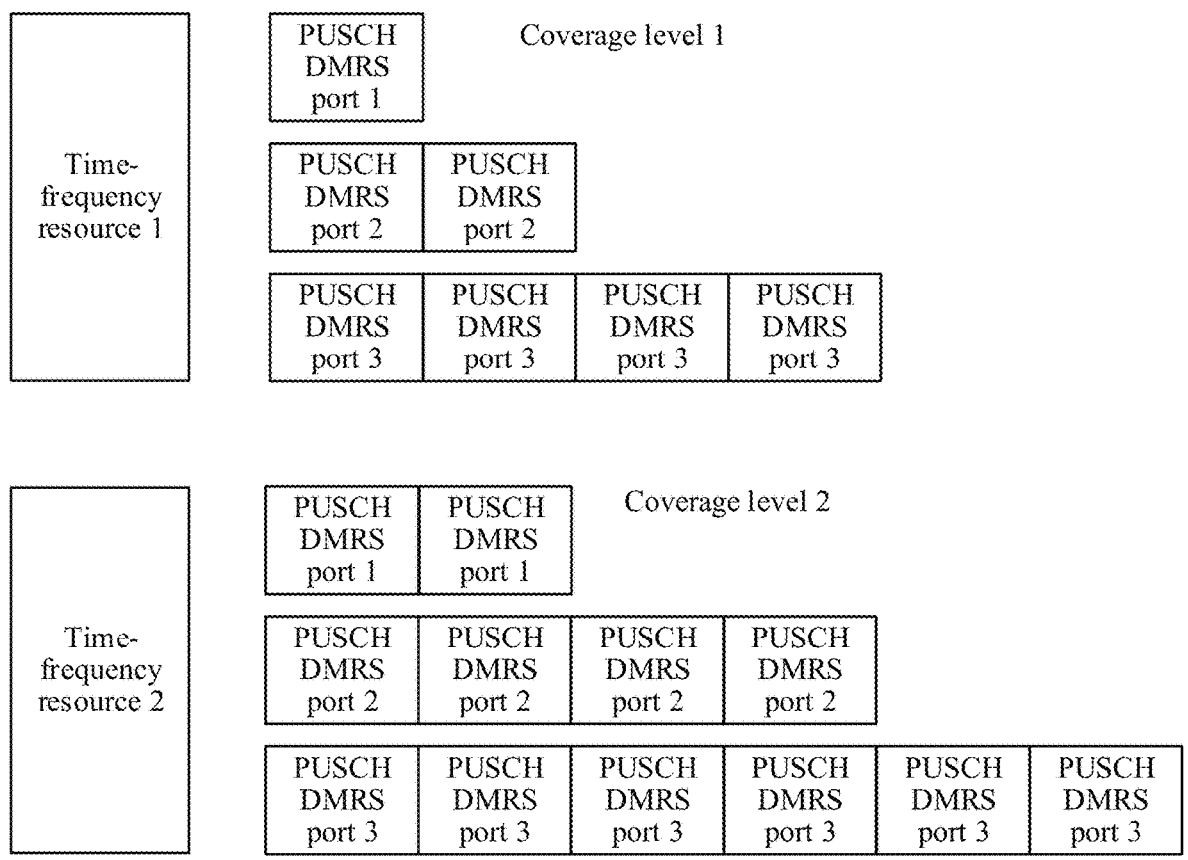

As shown in FIG. 11, two time-frequency resources are used as an example, and are denoted as a time-frequency resource 1 and a time-frequency resource 2 for differentiation. It is assumed that the time-frequency resource 1 is associated with a CE level 1, and the time-frequency resource 2 is associated with a CE level 2. Quantities that are of repeated transmissions of data and that are associated with the time-frequency resource 1 are 1, 2, and 4, a quantity that is of repeated transmissions of data and that is associated with a DMRS port 1 is 1, a quantity that is of repeated transmissions of data and that is associated with a DMRS port 2 is 2, a quantity that is of repeated transmissions of data and that is associated with a DMRS port 3 is 4, and a CE level associated with a preamble group 1 is the CE level 1; and quantities that are of repeated transmissions of data and that are associated with the time-frequency resource 2 are 2, 4, and 6, a quantity that is of repeated transmissions of data and that is associated with a DMRS port 1 is 2, a quantity that is of repeated transmissions of data and that is associated with a DMRS port 2 is 4, and a quantity that is of repeated transmissions of data and that is associated with a DMRS port 3 is 6.

For the terminal device, the terminal device may determine a CE level. For example, the terminal device determines the CE level 1. In this case, the terminal device may determine that the time-frequency resource for the data transmission is the time-frequency resource 1. In addition, the terminal device may alternatively determine a DMRS port based on the quantity of repeated transmissions of data obtained through calculation. For example, the terminal device determines that the quantity of repeated transmissions of data is 4. In this case, the terminal device determines that the DMRS port is the DMRS port 3.

For the network device, the network device may determine, through blind detection, the time-frequency resource for the data transmission, for example, determine the time-frequency resource 1, and determine the quantity of repeated transmissions of data based on a DMRS port.

It should be understood that three implementations are described as examples in Form 3. An embodiment of the application is not limited thereto.

With reference to Form 1 to Form 3 and implementations in various forms, the foregoing describes the association relationship between a resource and a quantity of repeated transmissions of data as an example. It should be understood that the application is not limited thereto. Any manner in which a resource may be associated with a quantity of repeated transmissions of data falls within the protection scope of an embodiment of the application.

If the method 300 is applied to a two-step random access procedure, the quantity that is of repeated transmissions of the target data and that is determined by the terminal device based on the configuration information may alternatively be a quantity of repeated transmissions of a preamble.

In other words, in the two-step random access procedure, a PUSCH and the preamble may be transmitted as one transmission unit, and the quantity that is of repeated transmissions of the target data and that is determined by the terminal device based on the configuration information may be a quantity of repeated transmissions of the transmission unit. The following describes the method 400 shown in FIG. 12.

Figure 12:
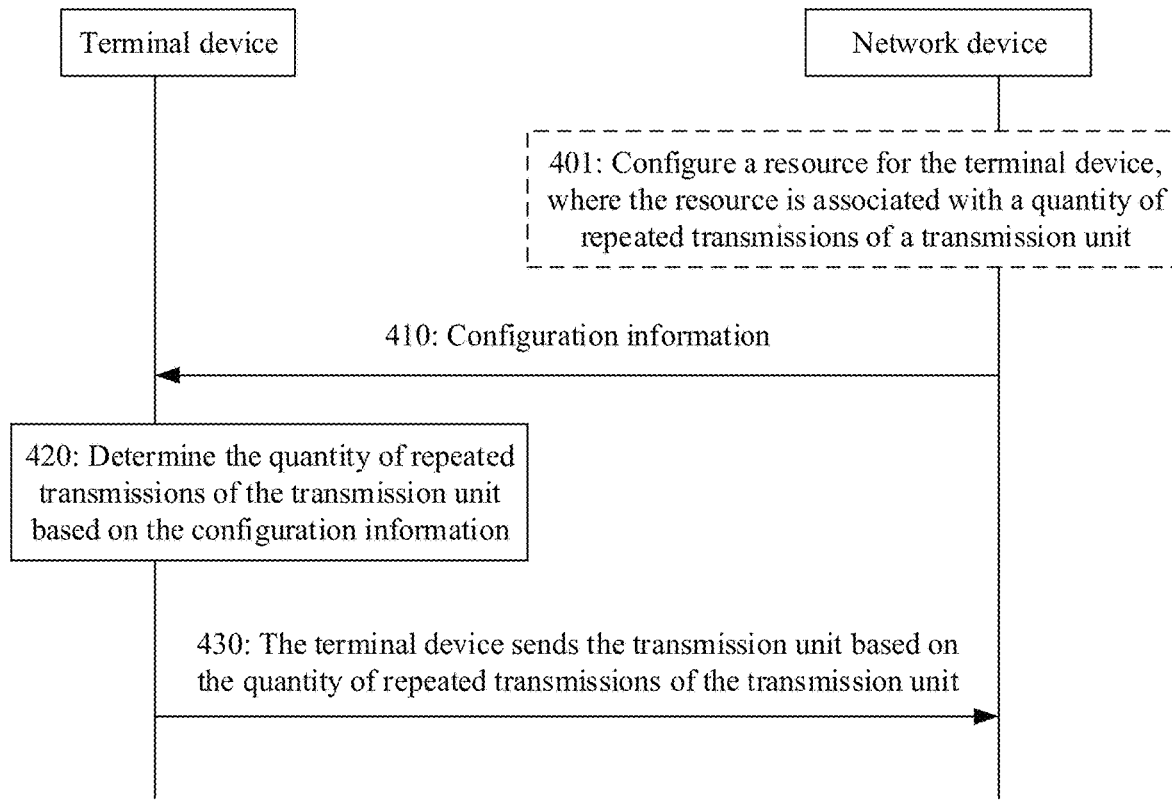
FIG. 12 is a schematic interaction diagram of a data sending method according to another embodiment of the application.

FIG. 12 is a schematic interaction diagram of a data sending method 400 according to an embodiment of the application. The method 400 may include the following operations.

410: A terminal device receives configuration information. Correspondingly, a network device sends the configuration information to the terminal device.

Figure 13:
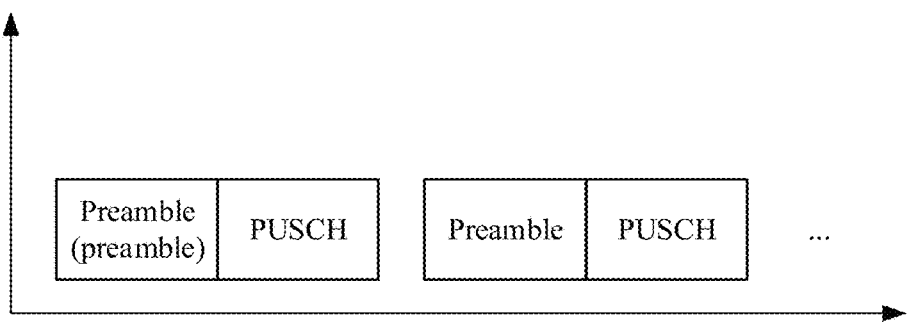
FIG. 13 and FIG. 14 are schematic diagrams of a mapping relationship between a preamble resource and a PUSCH resource according to an embodiment of the application.
Figure 14:
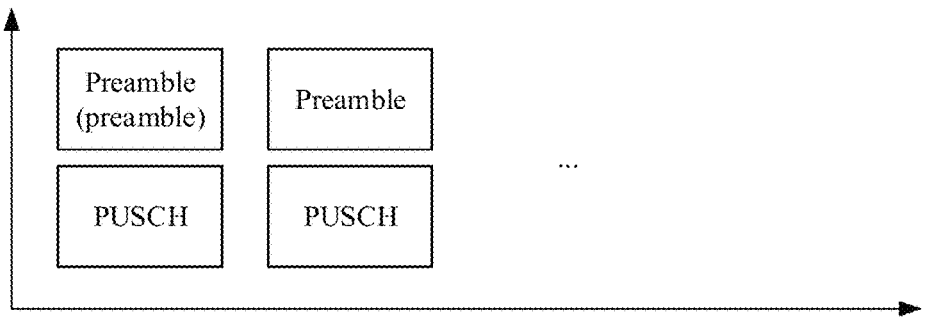

The terminal device receives the configuration information, and may determine a mapping relationship between a preamble resource and a PUSCH resource. FIG. 13 and FIG. 14 show two possible forms of a mapping relationship between a preamble resource and a PUSCH resource.

In the method 400, a preamble and a PUSCH may be transmitted as one transmission unit. In other words, one preamble resource and one PUSCH resource are used as one transmission unit. There may be a spacing between the preamble resource and the PUSCH resource in frequency domain. As shown in FIG. 14, there may be a spacing between the preamble resource and the PUSCH resource in frequency domain resources. Alternatively, there may be no spacing between the preamble resource and the PUSCH resource in frequency domain. Alternatively, there may be a spacing between the preamble resource and the PUSCH resource in time domain. Alternatively, there may be no spacing between the preamble resource and the PUSCH resource in time domain. As shown in FIG. 13, there may be no spacing between the preamble resource and the PUSCH resource in time domain resources.

Operation 410 is similar to operation 310, and only data in operation 310 needs to be replaced with a transmission unit. For example, the transmit power threshold in operation 310 represents a transmit power threshold of the data. In the method 400, the transmit power threshold represents a transmit power threshold of the transmission unit.

For details, refer to descriptions in operation 310. Details are not described herein again.

In an embodiment, before operation 410, the method 400 may further include operation 401.

For example, the network device configures a plurality of resources for the terminal device, and each resource corresponds to a quantity of repeated transmissions of one transmission unit.

The following describes in detail an association relationship between a resource and a quantity of repeated transmissions of a transmission unit.

420: The terminal device determines the quantity of repeated transmissions of the transmission unit based on the configuration information.

In an embodiment of the application, the terminal device may flexibly select the quantity of repeated transmissions of the transmission unit based on an actual situation, so that not only transmission performance of the transmission unit can be improved, but also signaling overheads caused by scheduling by the network device can be reduced.

In the method 400, the terminal device may determine the quantity of repeated transmissions of the transmission unit by using at least any one of the following solutions.

Solution 1: The terminal device determines a quantity of repeated transmissions of the PUSCH, and then uses the quantity of repeated transmissions of the PUSCH as the quantity of repeated transmissions of the transmission unit.

For a method for determining the quantity of repeated transmissions of the PUSCH by the terminal device, refer to the method for determining the quantity of repeated transmissions of data by the terminal device in the method 300 (as in case 1 and case 2 in operation 320), and details are not described herein again.

Solution 2: The terminal device determines the quantity of repeated transmissions of the transmission unit based on a configuration of the network device.

A quantity of repeated transmissions of the preamble may be preconfigured by the network device by using system information. In an embodiment of the application, the preamble and the PUSCH are used as one transmission unit, and the quantity of repeated transmissions of the transmission unit may also be configured by the network device by using system information. The terminal device may determine the quantity of repeated transmissions of the transmission unit based on the configuration of the network device.

Solution 3: The terminal device determines the quantity of repeated transmissions of the preamble, and then uses the quantity of repeated transmissions of the preamble as the quantity of repeated transmissions of the transmission unit.

The quantity of repeated transmissions of the preamble may be preconfigured by the network device by using system information. In an embodiment of the application, the preamble and the PUSCH are used as one transmission unit. The quantity of repeated transmissions of the transmission unit may be the quantity that is of repeated transmissions of the preamble and that is configured by the network device by using the system information.

Solution 4: The terminal device determines the quantity of repeated transmissions of the transmission unit based on the quantity of repeated transmissions of the preamble and the quantity of repeated transmissions of the PUSCH.

For example, when the quantity of repeated transmissions of the PUSCH obtained by the terminal device through calculation is different from the quantity of repeated transmissions of the preamble configured by the network device, the terminal device may use the quantity of repeated transmissions of the PUSCH or the quantity of repeated transmissions of the preamble as the quantity of repeated transmissions of the transmission unit.

For another example, when the quantity of repeated transmissions of the PUSCH obtained by the terminal device through calculation is different from the quantity of repeated transmissions of the preamble configured by the network device, the terminal device may use a quantity of repeated transmissions with a relatively small value as the quantity of repeated transmissions of the transmission unit.

For another example, when the quantity of repeated transmissions of the PUSCH obtained by the terminal device through calculation is different from the quantity of repeated transmissions of the preamble configured by the network device, the terminal device may use a quantity of repeated transmissions with a relatively large value as the quantity of repeated transmissions of the transmission unit.

Based on any one of the foregoing solutions, the terminal device may determine the quantity of repeated transmissions of the transmission unit.

430: The terminal device sends the preamble and the PUSCH to the network device based on the quantity of repeated transmissions of the transmission unit.

In an embodiment of the application, the terminal device sends the transmission unit, e.g., the preamble and the PUSCH, to the network device based on the quantity of repeated transmissions of the transmission unit.

That the terminal device sends the transmission unit to the network device based on the quantity of repeated transmissions of the transmission unit may indicate that a quantity of times that the terminal device sends the transmission unit to the network device is less than or equal to the quantity of repeated transmissions of the transmission unit. For example, the following two cases may be included.

In a possible case, the quantity of times that the terminal device sends the transmission unit to the network device is equal to a quantity of times that the transmission unit is repeatedly sent.

In another possible case, the quantity of times that the terminal device sends the transmission unit to the network device is less than a quantity of times that the transmission unit is repeatedly transmitted and sent. For example, before sending the transmission unit for the last time, the terminal device determines that the network device has successfully received the transmission unit.

In an embodiment, if the terminal device receives acknowledgement response information for the transmission unit when a quantity of transmissions of the transmission unit does not reach the quantity of repeated transmissions of the transmission unit, the terminal device stops sending the transmission unit. In other words, when the terminal device determines that the network device successfully receives the transmission unit, the terminal device may interrupt remaining unfinished repeated transmission of the transmission unit.

For example, it is assumed that the quantity that is of repeated transmissions of the transmission unit and that is determined by the terminal device is K. After the terminal device completes sending the transmission unit for an $i^{th}$ time (where i is less than K), the terminal device receives response information, such as HARQ-ACK information, that is sent by the network device for the transmission unit. The HARQ-ACK information indicates that the transmission unit is successfully received. In this case, the terminal device stops sending the transmission unit, to reduce signaling overheads and save resources.

For another example, the terminal device receives response information that corresponds to a MsgA, that is scheduled by using a PDCCH, and that is sent by the network device. When the terminal device detects a matched preamble index number and a matched contention resolution ID in the response information, the terminal device determines that the MsgA is successfully sent, and the terminal device stops sending the transmission unit.

For another example, it is assumed that the terminal device receives response information, such as HARQ-NACK information, sent by the network device for the transmission unit. The HARQ-NACK information indicates that the transmission unit is not successfully received. In this case, the terminal device continues to send the transmission unit, to ensure reliable transmission of the transmission unit.

It should be understood that there are many methods used by the terminal device to determine whether the network device successfully receives the transmission unit. This is not limited in the application. Any method in which the terminal device can determine whether the network device successfully receives or fails to receive the transmission unit falls within the protection scope of an embodiment of the application.

In an embodiment, a time interval between receiving the response information by the terminal device and determining, by the terminal device, that the transmission unit is successfully sent is t, and t may be a value greater than or equal to 0. t may be a pre-stipulated value, for example, predefined in a protocol or by the network device; or may be a value configured by the network device for the terminal device, for example, a value configured based on a data processing capability of the terminal device. This is not limited herein.

In an embodiment, the terminal device monitors response information for the transmission unit in a response time window.

For example, the response time window may be a time window configured by the network device for the terminal device. For example, the response time window may include duration and/or a start location of the time window. For another example, the response time window may alternatively be a pre-stipulated time window, and duration and/or a start location of the time window may both be pre-stipulated, for example, stipulated in a protocol.

For example, the network device may configure, for the terminal device, a response time window used to monitor response information MsgB corresponding to the MsgA. Because the preamble and the PUSCH are one transmission unit, the response time window may be a time window. In the time window, response information corresponding to the preamble in the MsgA and response information corresponding to the PUSCH in the MsgA may be monitored simultaneously. Duration and/or a start location of the time window may be pre-stipulated, or may be configured by the network device.

In an embodiment, the start location of the response time window may be a location at which the terminal device sends the transmission unit for an $m^{th}$ time, where m is greater than 0 or equal to 0, and m is less than or equal to the quantity of repeated transmissions of the transmission unit. In other words, after the terminal device sends the transmission unit for an $m^{th}$ time, the terminal device starts to monitor the response information for the transmission unit. When m=0, it indicates that when the terminal device starts to send the transmission unit for the first time, the terminal device starts to monitor the response information for the transmission unit.

It should be understood that, that the terminal device sends the transmission unit for an $m^{th}$ time may indicate that the terminal device starts to monitor the response information for the transmission unit after sending the transmission unit for an $m^{th}$ time, or may indicate that the terminal device starts to monitor the response information for the transmission unit when starting to send the transmission unit for an $m^{th}$ time, or may indicate that the terminal device starts to monitor the response information for the transmission unit in a process in which the terminal device starts to send the transmission unit for an $m^{th}$ time. This is not strictly limited.

In an embodiment, the start location of the response time window may be a first location that can be used to monitor a corresponding PDCCH after the terminal device sends the transmission unit for an $n^{th}$ time, where n is greater than 0 or equal to 0, and n is less than or equal to the quantity of repeated transmissions of the transmission unit.

The following describes in detail the association relationship between a resource and a quantity of repeated transmissions of a transmission unit mentioned in operation 401.

Operation 401 is similar to operation 301 in the method 300, except that a quantity of repeated transmissions in operation 401 is for the quantity of repeated transmissions of the transmission unit. The following uses a transmission unit as an example to briefly describe the association relationship between a resource and a quantity of repeated transmissions of a transmission unit. For detailed content, refer to descriptions in the foregoing method 300.

Form 1: One preamble group or one RO is associated with one quantity of repeated transmissions of the transmission unit.

The preamble group is used as an example. In an embodiment, the network device configures one or more preamble groups for the terminal device, each preamble group is associated with one quantity of repeated transmissions of the transmission unit, and a preamble in the transmission unit is of preambles in a preamble group corresponding to the transmission unit.

An example is described with reference to FIG. 15.

Figure 15:
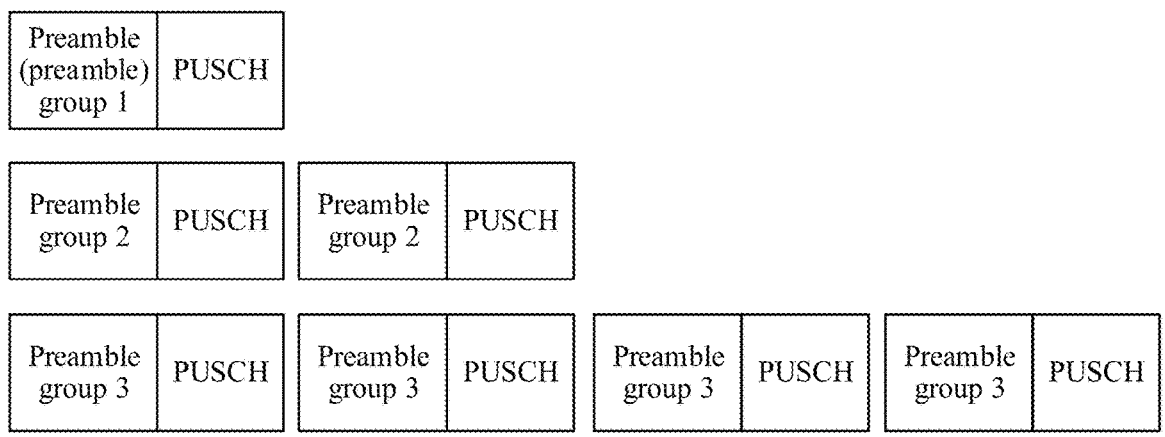
FIG. 15 to FIG. 18 are schematic diagrams of a mapping relationship between a resource and a quantity of repeated transmissions according to another embodiment of the application.

As shown in FIG. 15, three preamble groups are used as an example, and are denoted as a preamble group 1, a preamble group 2, and a preamble group 3 for differentiation. It is assumed that a quantity that is of repeated transmissions of a transmission unit and that is associated with the preamble group 1 is 1, a quantity that is of repeated transmissions of a transmission unit and that is associated with the preamble group 2 is 2, and a quantity that is of repeated transmissions of a transmission unit and that is associated with the preamble group 3 is 4.

For the terminal device, the terminal device may determine the quantity of repeated transmissions of the transmission unit based on any one of the foregoing implementations. Then, the terminal device selects any preamble in a corresponding preamble group based on an association between a preamble group and a quantity of repeated transmissions of a transmission unit, and sends the selected preamble to the network device. For example, if the terminal device determines that the quantity of repeated transmissions of the transmission unit is 2, the terminal device selects a preamble in the preamble group, and sends the selected preamble and a PUSCH to the network device as one transmission unit.

For the network device, the network device may determine the quantity of repeated transmissions of the transmission unit based on the preamble group in which the preamble is located and the association between a preamble group and a quantity of repeated transmissions of a transmission unit. For example, if the network device receives the transmission unit sent by the terminal device, and determines that a preamble in the transmission unit is of preambles in the preamble group 2, the network device determines, based on an association relationship between a preamble group and a quantity of repeated transmissions of a transmission unit, that the quantity of repeated transmissions of data is 2.

Form 2: One preamble group or one RO is associated with a plurality of quantities of repeated transmissions of the transmission unit.

The preamble group is used as an example. In an embodiment, the network device configures one preamble group for the terminal device, a preamble in the transmission unit sent by the terminal device is of preambles in the preamble group configured for the terminal device, and each preamble group is associated with a plurality of quantities of repeated transmissions of the transmission unit.

Alternatively, Form 2 may be represented as follows: Different terminal devices select different preambles, a preamble in a transmission unit of a same terminal device remains unchanged, and one preamble is associated with a plurality of quantities of repeated transmissions of the transmission unit.

The following uses the preamble group as an example for description.

Form 2 may include the following plurality of implementations.

Manner 1: Different time-frequency resources are associated with different quantities of repeated transmissions of data of the transmission unit.

In other words, one preamble group is associated with a plurality of quantities of repeated transmissions of the transmission unit, and different quantities of repeated transmissions are associated with different time-frequency resources.

An example is described with reference to FIG. 16.

Figure 16:
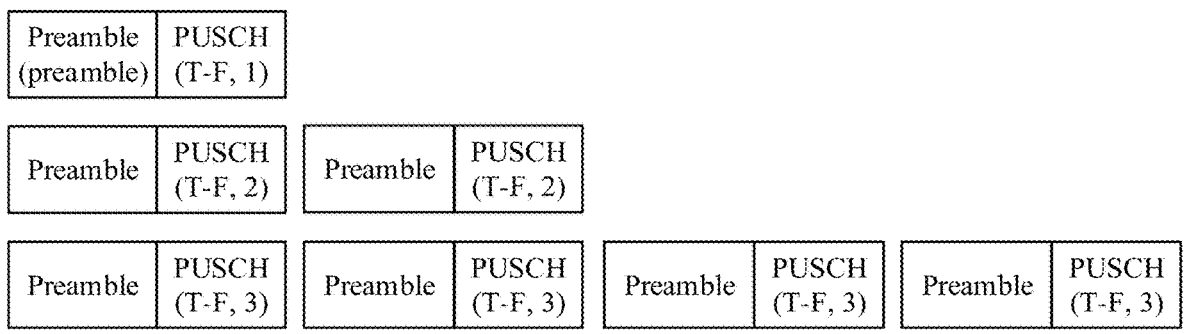

As shown in FIG. 16, one preamble group is used as an example, for example, denoted as a preamble group 1. It is assumed that quantities that are of repeated transmissions of the transmission unit and that are associated with the preamble group are 1, 2, and 4, a quantity that is of repeated transmissions of the transmission unit and that is associated with a time-frequency resource (T-F, 1) is 1, a quantity that is of repeated transmissions of the transmission unit and that is associated with a time-frequency resource (T-F, 2) is 2, and a quantity that is of repeated transmissions of the transmission unit and that is associated with a time-frequency resource (T-F, 3) is 4.

For the terminal device, assuming that the terminal device determines, based on any one of the foregoing implementations, that the quantity of repeated transmissions of the transmission unit is 4, and the preamble in the transmission unit is of preambles in the preamble group 1, the terminal device may determine that the time-frequency resource of the transmission unit is (T-F, 3).

For the network device, the network device determines a preamble group in which the preamble is located, determines, through blind detection, a time-frequency resource of the transmission unit, and then determines the quantity of repeated transmissions of the transmission unit based on the association relationship between a quantity of repeated transmissions of a transmission unit and a time-frequency resource. For example, the network device receives the transmission unit sent by the terminal device, and determines that the preamble in the transmission unit is of the preambles in the preamble group 1. Then, the network device determines, through blind detection, that the time-frequency resource of the transmission unit is (T-F, 3), and the network device determines, based on the association relationship between a quantity of repeated transmissions of a transmission unit and a time-frequency resource, that the quantity of repeated transmissions of the transmission unit is 4.

Therefore, when the time-frequency resource is associated with the quantity of repeated transmissions of the transmission unit, the terminal device may determine the time-frequency resource of the transmission unit based on the quantity of repeated transmissions of the transmission unit obtained through calculation and the association relationship between a quantity of repeated transmissions of a transmission unit and a time-frequency resource. The network device may determine the time-frequency resource of the transmission unit through blind detection, and determine the quantity of repeated transmissions of the transmission unit based on the association relationship between a quantity of repeated transmissions of a transmission unit and a time-frequency resource.

Manner 2: Different DMRS ports are associated with different quantities of repeated transmissions of the transmission unit.

In other words, one preamble group is associated with a plurality of quantities of repeated transmissions of the transmission unit, and different quantities of repeated transmissions are associated with different DMRS ports.

For the terminal device, the terminal device may obtain the quantity of repeated transmissions of the transmission unit through calculation based on any one of the foregoing implementations. Then, the terminal device may also determine a DMRS port based on an association relationship between a quantity of repeated transmissions of a transmission unit and a DMRS port.

An example is described with reference to FIG. 17.

Figure 17:
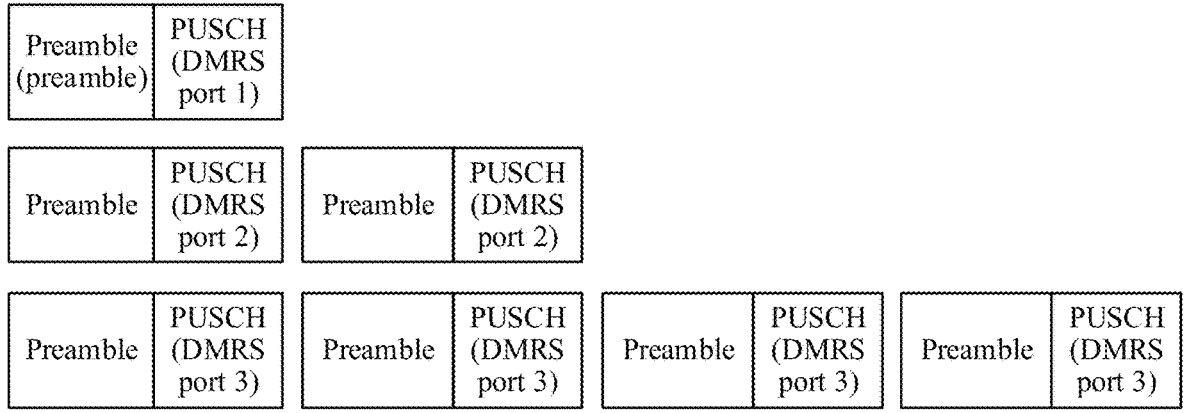

As shown in FIG. 17, one preamble group is used as an example, for example, denoted as a preamble group 1. It is assumed that quantities that are of repeated transmissions of the transmission unit and that are associated with the preamble group are 1, 2, and 4, a quantity that is of repeated transmissions of the transmission unit and that is associated with a DMRS port 1 is 1, a quantity that is of repeated transmissions of the transmission unit and that is associated with a DMRS port 2 is 2, and a quantity that is of repeated transmissions of the transmission unit and that is associated with a DMRS port 3 is 4.

For the terminal device, assuming that the terminal device determines that the quantity of repeated transmissions of the transmission unit is 4, and the preamble in the transmission unit is of preambles in the preamble group 1, the terminal device may determine that the DMRS port is the DMRS port 3.

For the network device, it is assumed that the network device receives the preamble sent by the terminal device, and determines that the preamble is of the preambles in the preamble group 1. Then, the network device determines that the DMRS port is the DMRS port 3, and the network device determines, based on the association relationship between a quantity of repeated transmissions of a transmission unit and a DMRS port, that the quantity of repeated transmissions of the transmission unit is 4.

Therefore, when the DMRS port is associated with the quantity of repeated transmissions of the transmission unit, the terminal device may determine the DMRS port of the transmission unit based on the quantity of repeated transmissions of the transmission unit obtained through calculation and the association relationship between a quantity of repeated transmissions of a transmission unit and a DMRS port. The network device determines the DMRS port, and determines the quantity of repeated transmissions of the transmission unit based on the association relationship between a quantity of repeated transmissions of a transmission unit and a DMRS port.

It should be understood that, in Manner 2, a port group in which the DMRS port is located may be associated with the quantity of repeated transmissions of the transmission unit.

Manner 3: Different CE levels are associated with different quantities of repeated transmissions of the transmission unit.

In other words, one preamble group is associated with a plurality of quantities of repeated transmissions of the transmission unit, and different quantities of repeated transmissions of the transmission unit are associated with different CE levels.

In addition, different CE levels may be further associated with different time-frequency resources and/or DMRS ports. Therefore, the terminal device may also determine a time-frequency resource and/or a DMRS port based on an association relationship between a quantity of repeated transmissions of a transmission unit and a CE level.

An example is described with reference to FIG. 18.

Figure 18:
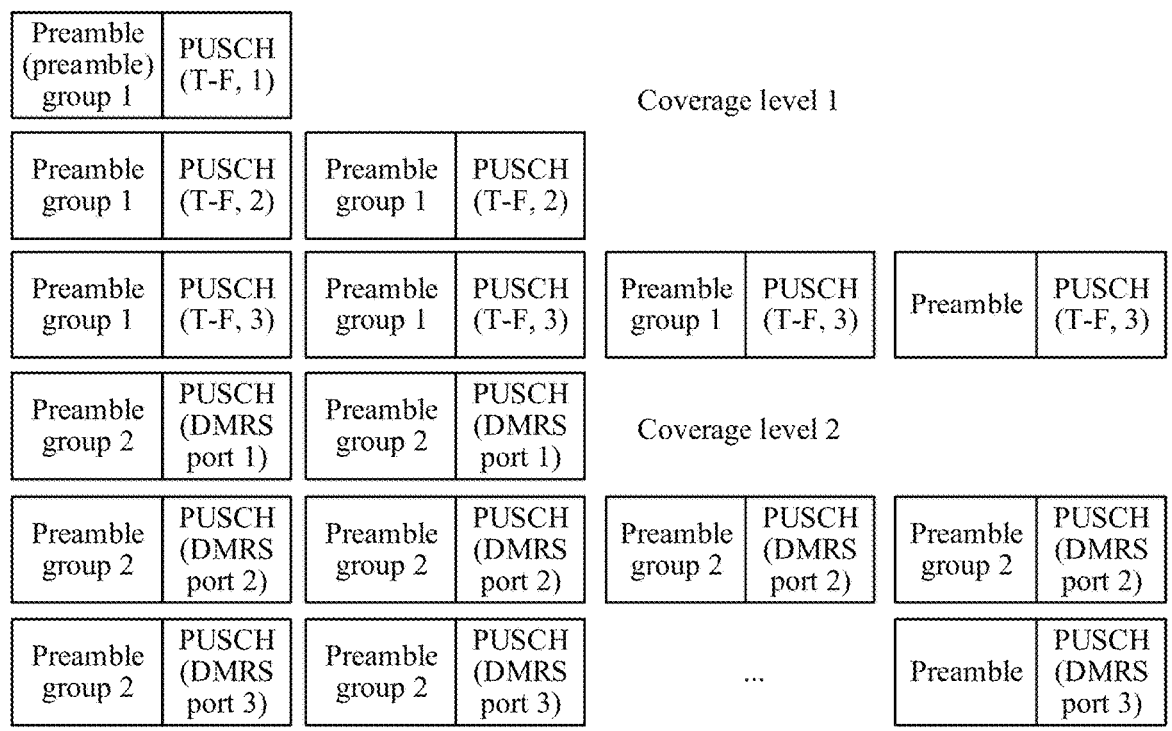

As shown in FIG. 18, two preamble groups are used as an example, and are denoted as a preamble group 1 and a preamble group 2 for differentiation. It is assumed that quantities that are of repeated transmissions of the transmission unit and that are associated with the preamble group 1 are 1, 2, and 4, a quantity that is of repeated transmissions of the transmission unit and that is associated with a time-frequency resource (T-F, 1) is 1, a quantity that is of repeated transmissions of the transmission unit and that is associated with a time-frequency resource (T-F, 2) is 2, a quantity that is of repeated transmissions of the transmission unit and that is associated with a time-frequency resource (T-F, 3) is 4, and a CE level associated with the preamble group 1 is a CE level 1. Quantities that are of repeated transmissions of the transmission unit and that are associated with the preamble group 2 are 2, 4, and 6, a quantity that is of repeated transmissions of the transmission unit and that is associated with a DMRS port 1 is 2, a quantity that is of repeated transmissions of the transmission unit and that is associated with a DMRS port 2 is 4, a quantity that is of repeated transmissions of the transmission unit and that is associated with a DMRS port 3 is 6, and a CE level associated with the preamble group 2 is a CE level 2.

For the terminal device, it is assumed that the terminal device determines that a CE level is the CE level 2. A manner in which the terminal device determines the CE level is not limited in an embodiment of the application. For example, refer to a manner in a conventional technology. Then, the terminal device may determine a corresponding DMRS port based on a quantity of repeated transmissions of the transmission unit obtained through calculation. For example, if the terminal device obtains, through calculation, that the quantity of repeated transmissions of the transmission unit is 2, the terminal device determines that the DMRS port is the DMRS port 1.

For the network device, the network device determines a preamble group in which a preamble is located, and determines the quantity of repeated transmissions of the transmission unit based on the time-frequency resource and/or the DMRS port and the association relationship between a quantity of repeated transmissions of a transmission unit and a CE level. For example, the network device receives the preamble sent by the terminal device, and determines that the preamble is of preambles in the preamble group 1. Then, the network device determines that the DMRS port is the DMRS port 1, and the network device determines, based on the association relationship between a quantity of repeated transmissions of a transmission unit and a DMRS port, that the quantity of repeated transmissions of the transmission unit is 2.

It should be understood that, in Manner 3, the CE level may also be associated with the DMRS port and/or the time-frequency resource, and the terminal device may further determine the time-frequency resource and/or the DMRS port based on the quantity of repeated transmissions of the transmission unit obtained through calculation and the association relationship between a quantity of repeated transmissions of a transmission unit and a CE level.

The foregoing describes several implementations in Form 2. This is not limited in an embodiment of the application. For example, any manner in which the network device may determine the quantity of repeated transmissions of the transmission unit based on the association relationship between a preamble group and a quantity of repeated transmissions of a transmission unit and an association relationship between a quantity of repeated transmissions of a transmission unit and a transmission parameter falls within the protection scope of an embodiment of the application. Alternatively, any manner in which the terminal device may determine the transmission parameter of the transmission unit based on the association relationship between a preamble group and a quantity of repeated transmissions of a transmission unit and the association relationship between a quantity of repeated transmissions of a transmission unit and a transmission parameter falls within the protection scope of an embodiment of the application.

Form 3: A transmission parameter is associated with the quantity of repeated transmissions of the transmission unit.

A transmission parameter indicates a parameter related to transmission of the transmission unit, for example, including but not limited to a time-frequency resource (e.g., a time-frequency resource used to transmit the transmission unit) of the transmission unit, a DMRS port, a port group to which the DMRS port belongs, a beam, and the like.

A plurality of different implementations are included based on different transmission parameters.

Manner A: Different time-frequency resources are associated with different quantities of repeated transmissions of the transmission unit.

For the terminal device, the terminal device may obtain the quantity of repeated transmissions of the transmission unit through calculation based on any one of the foregoing implementations. Then, the time-frequency resource of the transmission unit is determined based on an association relationship between a time-frequency resource and a quantity of repeated transmissions of a transmission unit.

For the network device, the network device may determine the time-frequency resource of the transmission unit through blind detection, and then determine the quantity of repeated transmissions of the transmission unit based on the association relationship between a quantity of repeated transmissions of a transmission unit and a time-frequency resource.

Manner B: Different DMRS ports are associated with different quantities of repeated transmissions of the transmission unit.

For the terminal device, the terminal device may obtain the quantity of repeated transmissions of the transmission unit through calculation based on any one of the foregoing implementations. Then, the DMRS port is determined based on an association relationship between a DMRS port and a quantity of repeated transmissions of a transmission unit.

For the network device, the network device may determine the quantity of repeated transmissions of the transmission unit based on the DMRS port and the association relationship between a quantity of repeated transmissions of a transmission unit and a DMRS port.

Manner C: Different DMRS ports are associated with different quantities of repeated transmissions of the transmission unit.

Different CE levels correspond to different time-frequency resources, time-frequency resources correspond to a plurality of quantities of repeated transmissions of the transmission unit, and a unique quantity of repeated transmissions may be determined for each block of time-frequency resources by using an orthogonal DMRS port. The network device may determine the quantity of repeated transmissions of the transmission unit based on the DMRS port and the time-frequency resource for blind detection.

It should be understood that three implementations are described as examples in Form 3. An embodiment of the application is not limited thereto.

It should be further understood that the foregoing descriptions are merely brief descriptions, and for details, refer to descriptions in the method 300.

With reference to Form 1 to Form 3 and implementations in various forms, the foregoing describes the association relationship between a resource and a quantity of repeated transmissions of a transmission unit as an example. It should be understood that the application is not limited thereto. Any manner in which a resource may be associated with a quantity of repeated transmissions of a transmission unit falls within the protection scope of an embodiment of the application.

It should be understood that in some of the foregoing embodiments, an example in which data is a PUSCH is used for description. However, this does not limit the application. Any repeatedly transmitted data is applicable to the embodiments of the application.

Based on the foregoing technical solutions, when data needs to be repeatedly transmitted, the terminal device may determine a quantity of repeated transmissions of the data based on a receive power. In this way, not only signaling overheads caused by scheduling by the network device can be reduced, but also the terminal device may flexibly select the quantity of repeated transmissions of the data based on an actual situation, so that data transmission performance is improved.

Embodiments described in the specification may be independent solutions, or may be combined based on internal logic. All these solutions fall within the protection scope of the application.

It may be understood that in the foregoing method embodiments, the methods and operations that are implemented by the terminal device may alternatively be implemented by a component (for example, a chip or a circuit) that may be used in the terminal device, and the methods and the operations that are implemented by the network device may alternatively be implemented by a component (for example, a chip or a circuit) that may be used in the network device.

The methods provided in the embodiments of the application are described above in detail with reference to FIG. 6 to FIG. 18. The following describes in detail communication apparatuses provided in the embodiments of the application with reference to FIG. 19 to FIG. 22. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of the application from a perspective of interaction between the network elements. It may be understood that, to perform the foregoing functions, each network element, such as a transmit end device or a receive end device, includes a corresponding hardware structure and/or software module for performing each function. One of ordinary skill in the art may be aware that, with reference to the examples described in the embodiments disclosed in the specification, units and algorithm operations may be performed by hardware or a combination of computer software and hardware in the application. Whether a function is performed by hardware or hardware driven by computer software depends on particular applications and design constraints of the technical solutions. One of ordinary skill in the art may use different methods to implement the described functions for each particular application, but it should not be considered that the implementation goes beyond the scope of the application.

In the embodiments of the application, the transmit end device or the receive end device may be divided into functional modules based on the foregoing method examples. For example, each functional module may be obtained through division based on a corresponding function, or two or more functions may be integrated into one processing module. The foregoing integrated module may be implemented in a form of hardware, or may be implemented in a form of a software functional module. It should be noted that module division in the embodiments of the application is an example, and is merely a logical function division. During actual implementation, another division manner may be used. An example in which each functional module is obtained through division based on a corresponding function is used below for description.

Figure 19:
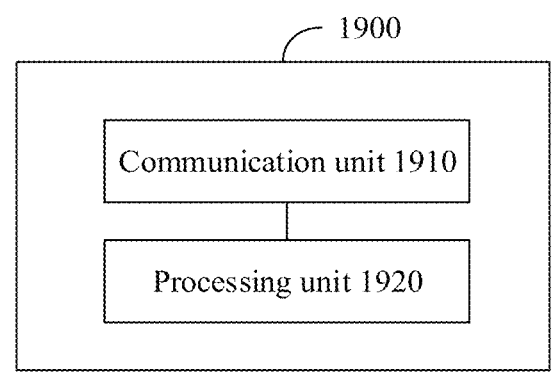
FIG. 19 is a schematic block diagram of a communication apparatus according to an embodiment of the application.

FIG. 19 is a schematic block diagram of a communication apparatus according to an embodiment of the application. As shown in the figure, the communication apparatus 1900 may include a communication unit 1910 and a processing unit 1920. The communication unit 1910 may communicate with the outside, and the processing unit 1920 is configured to process data. The communication unit 1910 may also be referred to as a communication interface or a transceiver unit.

In a possible design, the communication apparatus 1900 may perform an operation or a procedure performed by the terminal device in the foregoing method embodiments, for example, may be the terminal device, or a chip or circuit configured in the terminal device. In this case, the communication apparatus 1900 may be referred to as a terminal device. The communication unit 1910 is configured to perform a sending/receiving-related operation on a terminal device side in the foregoing method embodiments, and the processing unit 1920 is configured to perform a processing-related operation of the terminal device in the foregoing method embodiments.

In an embodiment, the communication unit 1910 is configured to receive configuration information of a target receive power from a network device. The processing unit 1920 is configured to determine a quantity of repeated transmissions of target data based on the configuration information of the target receive power. The communication unit 1910 is further configured to send the target data based on the quantity of repeated transmissions of the target data.

In an embodiment, the processing unit 1920 is configured to: determine the quantity of repeated transmissions of the target data based on the configuration information of the target receive power and a power increment step; determine the quantity of repeated transmissions of the target data based on the configuration information of the target receive power and a coverage level of the communication apparatus 1900; or determine the quantity of repeated transmissions of the target data based on the configuration information of the target receive power, a power increment step, and a coverage level of the communication apparatus 1900.

In an embodiment, the processing unit 1920 is configured to determine the quantity of repeated transmissions of the target data based on the configuration information of the target receive power and one or more of the following parameters: a transmit power of the communication apparatus 1900, a candidate quantity of repeated transmissions, a path loss value obtained through measurement by the processing unit 1920, or a parameter related to the transmit power of the communication apparatus 1900.

In an embodiment, the quantity of repeated transmissions of the target data satisfies any one of the following formulas: $P1+P2\cdot 10\cdot \log_{10} K \geq T$; $P1+P2\cdot 10\cdot \log_{10} K \geq T$, and $K \geq K_{CElevel,min}$; $P1+(i-1)\cdot P3+P2\cdot 10\cdot \log_{10} K \geq T$; or $P1(i+1)\cdot P3+P2\cdot 10\cdot \log_{10} K \geq T$, and $K \geq K_{CElevel,min}$. T is a transmit power threshold obtained through calculation based on the following parameters: the target receive power, the path loss value obtained through measurement by the processing unit 1920, and the parameter related to the transmit power of the communication apparatus 1900. P1 indicates the transmit power of the communication apparatus 1900, and $P1_{max} \geq P1$. $P1_{max}$ is a maximum transmit power of the communication apparatus 1900. P2 indicates a repeated transmission gain adjustment factor. P3 indicates the power increment step. K indicates the quantity of repeated transmissions of the target data. i indicates that the communication unit 1910 sends the target data for an $i^{th}$ time, where i=1, 2, . . . , K. $K_{CElevel,min}$ indicates a minimum quantity of repeated transmissions corresponding to the communication apparatus 1900 at different coverage levels, and $K \geq K_{CElevel,min}$.

In an embodiment, the processing unit 1920 is further configured to determine a transmission parameter of the target data based on the quantity of repeated transmissions of the target data and a first mapping relationship. The first mapping relationship is a correspondence between a quantity of repeated transmissions of data and a transmission parameter of the data, and the data includes the target data.

In an embodiment, the processing unit 1920 is further configured to determine a random access preamble based on the quantity of repeated transmissions of the target data and a second mapping relationship. The second mapping relationship includes a relationship between a quantity of repeated transmissions of target data and a random access preamble. The communication unit 1910 is further configured to send the target data and the random access preamble based on the quantity of repeated transmissions of the target data.

In an embodiment, the second mapping relationship is the relationship between a quantity of repeated transmissions of data and a random access preamble; the second mapping relationship is a relationship between a quantity of repeated transmissions of data and a random access preamble group; the second mapping relationship is a relationship between a quantity of repeated transmissions of data and a random access slot; or the second mapping relationship is a relationship between a quantity of repeated transmissions of data and a transmission parameter of the data.

In an embodiment, the transmission parameter of the data includes one or more of the following parameters: a time-frequency resource, a port of a demodulation reference signal DMRS, and a port group to which the port for demodulating the DMRS belongs.

In an embodiment, the communication unit 1910 is further configured to monitor, in a time window, response information for the target data, where a start location of the time window is a location at which the communication unit 1910 sends the target data for an $m^{th}$ time; or a first location that can be used to monitor a corresponding physical downlink control channel after the communication unit 1910 sends the target data for an $n^{th}$ time, where m=0, 1, K, and n=0, 1, . . . , K.

In an embodiment, the target receive power is a target receive power of the target data.

In an embodiment, the processing unit 1920 is configured to determine, based on the configuration information of the target receive power, a quantity of repeated transmissions of a physical uplink shared channel PUSCH in a first message MsgA in a random access procedure, where the MsgA includes the PUSCH and a random access preamble, and a quantity of repeated transmissions of the random access preamble is the same as the quantity of repeated transmissions of the PUSCH.

In an embodiment, if the communication unit 1910 receives acknowledgement response information for the target data when a quantity of transmissions of the target data does not reach the quantity of repeated transmissions of the target data, the communication unit 1910 stops sending the target data.

The communication apparatus 1900 may perform operations or procedures performed by the terminal device in the method 300 and the method 400 according to the embodiments of the application. The communication apparatus 1900 may include units configured to perform methods performed by the terminal device in the method 300 in FIG. 6 and the method 400 in FIG. 12. In addition, the units in the communication apparatus 1900 and the foregoing other operations and/or functions are separately intended to implement corresponding procedures of the method 300 in FIG. 6 and the method 400 in FIG. 12.

When the communication apparatus 1900 is configured to perform the method 300 in FIG. 6, the communication unit 1910 may be configured to perform operation 310 and operation 330 in the method 300, and the processing unit 1920 may be configured to perform operation 320 in the method 300.

When the communication apparatus 1900 is configured to perform the method 400 in FIG. 12, the communication unit 1910 may be configured to perform operation 410 and operation 430 in the method 400, and the processing unit 1920 may be configured to perform operation 401 in the method 400.

It should be understood that, a process of performing a corresponding operation by each unit has been described in detail in the foregoing method embodiments. For brevity, details are not described herein again.

In an embodiment, the communication unit 1910 is configured to receive information about a transmit power threshold from a network device. The processing unit 1920 is configured to determine a quantity of repeated transmissions of target data based on the transmit power threshold. The communication unit 1910 is further configured to send the target data based on the quantity of repeated transmissions of the target data.

In an embodiment, the transmit power threshold is obtained through calculation based on the following parameters: a target receive power, a path loss value obtained by the network device through measurement, or a transmit power of the communication apparatus 1900.

In an embodiment, the quantity of repeated transmissions of the target data satisfies any one of the following formulas: $P1+P2 \cdot 10 \cdot \log_{10} K \geq T$; $P1+P2 \cdot 10 \cdot \log_{10} K \geq T$, and $K \geq K_{CElevel,min}$. $P1+(i-1) \cdot P3+P2 \cdot 10 \cdot \log_{10} K \geq T$; or $P1+(i-1) \cdot P3+P2 \cdot 10 \cdot \log_{10} K \geq T$, and $K \geq K_{CElevel,min}$. T is the transmit power threshold. P1 indicates the transmit power of the communication apparatus 1900, and $P1_{max} \geq P1$. $P1_{max}$ is a maximum transmit power of the communication apparatus 1900. P2 indicates a repeated transmission gain adjustment factor. P3 indicates a power increment step. K indicates the quantity of repeated transmissions of the target data. i indicates that the communication unit 1910 sends the target data for an $i^{th}$ time, where i=1, 2, . . . , K. $K_{CElevel,min}$ indicates a minimum quantity of repeated transmissions corresponding to the communication apparatus 1900 at different coverage levels, and $K \geq K_{CElevel,min}$.

The communication apparatus 1900 may perform operations or procedures performed by the terminal device in the method 300 and the method 400 according to the embodiments of the application. The communication apparatus 1900 may include units configured to perform methods performed by the terminal device in the method 300 in FIG. 6 and the method 400 in FIG. 12. In addition, the units in the communication apparatus 1900 and the foregoing other operations and/or functions are separately intended to implement corresponding procedures of the method 300 in FIG. 6 and the method 400 in FIG. 12.

When the communication apparatus 1900 is configured to perform the method 300 in FIG. 6, the communication unit 1910 may be configured to perform operation 310 and operation 330 in the method 300, and the processing unit 1920 may be configured to perform operation 320 in the method 300.

When the communication apparatus 1900 is configured to perform the method 400 in FIG. 12, the communication unit 1910 may be configured to perform operation 410 and operation 430 in the method 400, and the processing unit 1920 may be configured to perform operation 420 in the method 400.

It should be understood that, a process of performing a corresponding operation by each unit has been described in detail in the foregoing method embodiments. For brevity, details are not described herein again.

Figure 21:
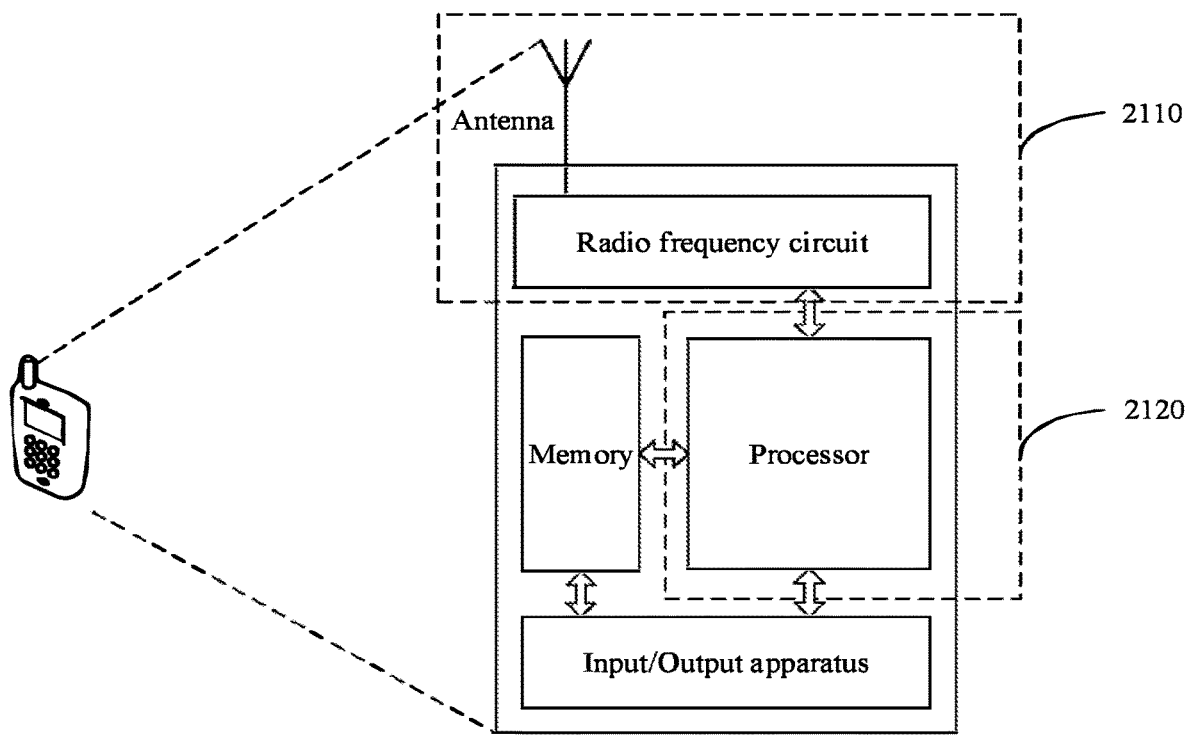
FIG. 21 is a schematic structural diagram of a terminal device according to an embodiment of the application.

It should be further understood that the communication unit 1910 in the communication apparatus 1900 may be implemented by using a transceiver 2110 in a terminal device 2100 shown in FIG. 21, and the processing unit 1920 in the communication apparatus 1900 may be implemented by using a processor 2120 in the terminal device 2100 shown in FIG. 21. The transceiver may include a transmitter and/or a receiver, to respectively implement functions of a sending unit and a receiving unit.

It should be further understood that the communication unit 1910 in the communication apparatus 1900 may alternatively be an input/output interface.

In another possible design, the communication apparatus 1900 may perform an operation or a procedure performed by the network device in the foregoing method embodiments, for example, may be the network device, or a chip or circuit configured in the network device. In this case, the communication apparatus 1900 may be referred to as a network device. The communication unit 1910 is configured to perform a sending/receiving-related operation on a network device side in the foregoing method embodiments, and the processing unit 1920 is configured to perform a processing-related operation of the network device in the foregoing method embodiments.

In an embodiment, the processing unit 1920 is configured to configure a resource for the terminal device, where the resource is associated with a quantity of repeated transmissions of data. The communication unit 1910 is configured to detect, on the configured resource, data sent by the terminal device.

In an embodiment, the processing unit 1920 is configured to configure a target receive power and/or a transmit power threshold for the terminal device.

In an embodiment, the transmit power threshold is obtained through calculation based on the following parameters: a target receive power, a path loss value obtained through measurement by the processing unit 1920, or a transmit power of the terminal device.

The communication apparatus 1900 may perform operations or procedures performed by the network device in the method 300 and the method 400 according to the embodiments of the application. The communication apparatus 1900 may include units configured to perform methods performed by the network device in the method 300 in FIG. 6 and the method 400 in FIG. 12. In addition, the units in the communication apparatus 1900 and the foregoing other operations and/or functions are separately intended to implement corresponding procedures of the method 300 in FIG. 6 and the method 400 in FIG. 12.

When the communication apparatus 1900 is configured to perform the method 300 in FIG. 6, the communication unit 1910 may be configured to perform operation 310 and operation 330 in the method 300, and the processing unit 1920 may be configured to perform operation 301 in the method 300.

When the communication apparatus 1900 is configured to perform the method 400 in FIG. 12, the communication unit 1910 may be configured to perform operation 410 and operation 430 in the method 400, and the processing unit 1920 may be configured to perform operation 401 in the method 400.

It should be understood that, a process of performing a corresponding operation by each unit has been described in detail in the foregoing method embodiments. For brevity, details are not described herein again.

Figure 22:
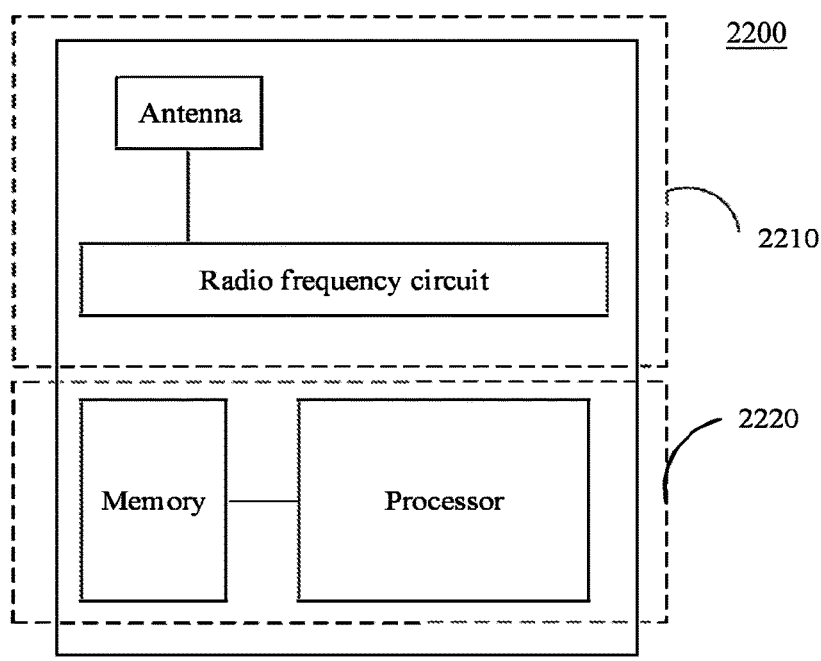
FIG. 22 is a schematic structural diagram of a network device according to an embodiment of the application.

It should be further understood that the communication unit in the communication apparatus 1900 may be implemented by using a transceiver 2210 in a network device 2200 shown in FIG. 22, and the processing unit 1920 in the communication apparatus 1900 may be implemented by using a processor 2220 in the network device 2200 shown in FIG. 22.

It should be further understood that the communication unit 1910 in the communication apparatus 1900 may alternatively be an input/output interface. The transceiver may include a transmitter and/or a receiver, to respectively perform functions of a sending unit and a receiving unit.

Figure 20:
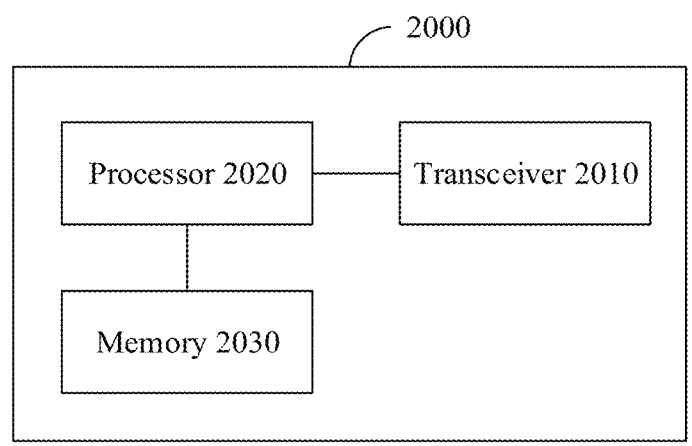
FIG. 20 is another schematic block diagram of a communication apparatus according to an embodiment of the application.

FIG. 20 is another schematic block diagram of a communication apparatus 2000 according to an embodiment of the application. As shown in the figure, the communication apparatus 2000 includes a transceiver 2010, a processor 2020, and a memory 2030. The memory 2030 stores a program. The processor 2020 is configured to execute the program stored in the memory 2030. Execution of the program stored in the memory 2030 enables the processor 2020 to perform processing-related operations in the foregoing method embodiments, and enables the processor 2020 to control the transceiver 2010 to perform receiving/sending-related operations in the foregoing method embodiments.

In an embodiment, the communication apparatus 2000 is configured to perform the action performed by the terminal device in the foregoing method embodiments. In this case, the execution of the program stored in the memory 2030 enables the processor 2020 to perform processing operations on a terminal device side in the foregoing method embodiments, and enables the processor 2020 to control the transceiver 2010 to perform receiving and sending operations on the terminal device side in the foregoing method embodiments.

In another embodiment, the communication apparatus 2000 is configured to perform the action performed by the network device in the foregoing method embodiments. In this case, the execution of the program stored in the memory 2030 enables the processor 2020 to perform processing operations on a network device side in the foregoing method embodiments, and enables the processor 2020 to control the transceiver 2010 to perform receiving and sending operations on the network device side in the foregoing method embodiments.

An embodiment of the application further provides a communication apparatus 2100. The communication apparatus 2100 may be a terminal device or a chip. The communication apparatus 2100 may be configured to perform an action performed by the terminal device in the foregoing method embodiments.

When the communication apparatus 2100 is the terminal device, FIG. 21 is a simplified schematic structural diagram of a terminal device. For ease of understanding and illustration, an example in which the terminal device is a mobile phone is used in FIG. 21. As shown in FIG. 21, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that terminal devices of some types may have no input/output apparatus.

When needing to send data, after performing baseband processing on the to-be-sent data, the processor outputs a baseband signal to the radio frequency circuit, and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 21 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in an embodiment of the application.

In an embodiment of the application, the antenna and the radio frequency circuit that have receiving and sending functions may be considered as a transceiver unit of the terminal device, and the processor that has a processing function may be considered as a processing unit of the terminal device.

As shown in FIG. 21, the terminal device includes a transceiver unit 2110 and a processing unit 2120. The transceiver unit 2110 may also be referred to as a transceiver, a transceiver machine, a transceiver apparatus, or the like. The processing unit 2120 may also be referred to as a processor, a processing board, a processing module, a processing apparatus, or the like. In an embodiment, a component that is in the transceiver unit 2110 and that is configured to implement a receiving function may be considered as a receiving unit, and a component that is in the transceiver unit 2110 and that is configured to implement a sending function may be considered as a sending unit. That is, the transceiver unit 2110 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit may also be sometimes referred to as a transmitter machine, a transmitter, a transmitting circuit, or the like.

In an embodiment, the processing unit 2120 is configured to perform operation 320 in FIG. 6 and operation 420 in FIG. 12, and/or the processing unit 2120 is further configured to perform another processing operation on a terminal device side in the embodiments of the application. The transceiver unit 2110 is further configured to perform operation 310 and operation 330 shown in FIG. 6, and operation 410 and operation 430 shown in FIG. 12, and/or the transceiver unit 2110 is further configured to perform another sending/receiving operation on the terminal device side.

It should be understood that FIG. 21 is merely an example instead of a limitation. The terminal device including the transceiver unit and the processing unit may not depend on the structure shown in FIG. 21.

When the communication device 2100 is a chip, the chip includes a transceiver unit and a processing unit. The transceiver unit may be an input/output circuit or a communication interface. The processing unit may be a processor, a microprocessor, or an integrated circuit, integrated on the chip.

An embodiment of the application further provides a communication apparatus 2200. The communication apparatus 2200 may be a network device or a chip. The communication apparatus 2200 may be configured to perform an action performed by the network device in the foregoing method embodiments.

When the communication apparatus 2200 is the network device, for example, a base station, FIG. 22 is a simplified schematic structural diagram of a base station. The base station includes a part 2210 and a part 2220. The part 2210 is mainly configured to: send and receive a radio frequency signal, and perform conversion between the radio frequency signal and a baseband signal. The part 2220 is mainly configured to: perform baseband processing, control the base station, and the like. The part 2210 may usually be referred to as a transceiver unit, a transceiver machine, a transceiver circuit, a transceiver, or the like. The part 2220 is usually a control center of the base station, and may usually be referred to as a processing unit, and is configured to control the base station to perform processing operations on a network device side in the foregoing method embodiments.

The transceiver unit in the part 2210 may also be referred to as a transceiver machine, a transceiver, or the like. The transceiver unit includes an antenna and a radio frequency unit. The radio frequency unit is mainly configured to perform radio frequency processing. In an embodiment, a component that is in the part 2210 and that is configured to perform a receiving function may be considered as a receiving unit, and a component that is in the part 2210 and that is configured to perform a sending function may be considered as a sending unit. That is, the part 2210 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 2220 may include one or more boards, and each board may include one or more processors and one or more memories. The processor is configured to read and execute a program in the memory to perform a baseband processing function and control the base station. If there are a plurality of boards, the boards may be interconnected to enhance a processing capability. In an embodiment, the plurality of boards may share one or more processors, or the plurality of boards may share one or more memories, or the plurality of boards may simultaneously share one or more processors.

For example, in an embodiment, the transceiver unit in the part 2210 is configured to perform a sending operation on a network device side in operation 310 and operation 320 shown in FIG. 6, and operation 410 and operation 430 shown in FIG. 12, and/or the transceiver unit in part 2210 is further configured to perform another sending/receiving operation on the network device side in the embodiments of the application. The processing unit in the part 2220 is configured to perform a processing operation in operation 301 in FIG. 6 and in operation 401 in FIG. 12, and/or the processing unit in the part 2220 is further configured to perform a processing operation on a network device side in the embodiments of the application.

It should be understood that FIG. 22 is merely an example instead of a limitation. The network device including the transceiver unit and the processing unit may not depend on the structure shown in FIG. 22.

When the communication apparatus 2200 is the chip, the chip includes a transceiver unit and a processing unit. The transceiver unit may be an input/output circuit or a communication interface. The processing unit is a processor, a microprocessor, or an integrated circuit integrated on the chip.

In addition, the network device is not limited to the foregoing forms, and may also be in another form. For example, the network device includes a BBU and an adaptive radio unit (ARU), or includes a BBU and an active antenna unit (AAU), or may be customer premises equipment (CPE), or may be in another form. This is not limited in the application.

The BBU may be configured to perform an action that is implemented inside the network device and that is described in the foregoing method embodiments, and the RRU may be configured to perform an action of receiving or sending that is performed by the network device from or to the terminal device and that is described in the foregoing method embodiments. For details, refer to the descriptions in the foregoing method embodiments. Details are not described herein again.

An embodiment of the application further provides a processing apparatus, including a processor and an interface. The processor may be configured to perform the methods described in the method embodiments.

It should be understood that, the processing apparatus may be a chip. For example, the processing apparatus may be a field programmable gate array (FPGA), an application-specific integrated circuit (ASIC), a system on a chip (SoC), a central processing unit (CPU), a network processor (NP), a digital signal processor (DSP), a micro controller unit (MCU), a programmable logic device (PLD), or another integrated chip.

In an embodiment, operations in the foregoing methods can be completed by using a hardware integrated logical circuit in the processor, or by using instructions in a form of software. The operations in the methods disclosed with reference to the embodiments of the application may be directly performed and completed through a hardware processor, or may be performed and completed through a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that, the processor in the embodiments of the application may be an integrated circuit chip, and has a signal processing capability. In an embodiment, operations in the foregoing method embodiments can be completed by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the operations, and logical block diagrams that are disclosed in the embodiments of the application. The general-purpose processor may be a microprocessor, any conventional processor, or the like. The operations in the methods disclosed with reference to the embodiments of the application may be directly performed and completed through a hardware decoding processor, or may be performed and completed through a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads the information in the memory and completes the operations in the foregoing methods in combination with hardware of the processor.

It may be understood that the memory in the embodiments of the application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that the memories in the systems and method described in the specification include but are not limited to these memories and any memory of another suitable type.

According to the methods provided in the embodiments of the application, the application further provides a computer program product. The computer program product includes computer program code. When the computer program code is run on a computer, the computer is enabled to perform the method in any one of the embodiments shown in FIG. 6 to FIG. 18.

According to the methods provided in the embodiments of the application, the application further provides a computer-readable medium. The computer-readable medium stores program code. When the program code is run on a computer, the computer is enabled to perform the method in any one of the embodiments shown in FIG. 6 to FIG. 18.

According to the method provided in the embodiments of the application, the application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of the application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the network device or the terminal device in the method embodiments. A corresponding module or unit performs a corresponding operation. For example, a communication unit (e.g., a transceiver) performs a receiving operation or a sending operation in the method embodiments, and another operation other than the sending operation and the receiving operation may be performed by a processing unit (e.g., a processor). For a function of a corresponding unit, refer to corresponding method embodiments. There may be one or more processors.

Terms such as "component", "module", and "system" used in the specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using a signal).

A person of ordinary skill in the art may be aware that, with reference to the examples described in the embodiments disclosed in the specification, units and algorithm operations may be implemented by electronic hardware or a combination of computer software and electronic hardware. Whether the functions are performed by hardware or software depends on particular applications and design constraints of the technical solutions. One of ordinary skill in the art may use different methods to implement the described functions for each particular application, but it should not be considered that the implementation goes beyond the scope of the application.

It may be clearly understood by one of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided in the application, it should be understood that the disclosed system, apparatuses, and method may be implemented in other manners. The described apparatus embodiments are merely an example. For example, the unit division is merely logical function division, and in actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of the application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the operations in the methods described in the embodiments of the application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of the application, but the protection scope of the application is not limited thereto. Any variation or replacement that can be readily figured out by one of ordinary skill in the art within the technical scope disclosed in the application shall fall within the protection scope of the application. Therefore, the protection scope of the application shall be subject to the protection scope of the claims.

What is claimed is:

1. A data sending method comprising:
 receiving, by a terminal device, configuration information of a target receive power from a network device;
 determining, by the terminal device, a quantity of repeated transmissions of target data based on the configuration information of the target receive power;

determining, by the terminal device, a random access preamble based on the quantity of repeated transmissions of the target data and a first mapping relationship, wherein the first mapping relationship comprises a relationship between the quantity of repeated transmissions of the target data and the random access preamble; and sending, by the terminal device, the target data and the random access preamble based on the quantity of repeated transmissions of the target data.

2. The method according to claim 1, wherein determining, by the terminal device, the quantity of repeated transmissions of target data based on the configuration information of the target receive power comprises:

determining, by the terminal device, the quantity of repeated transmissions of the target data based on the configuration information of the target receive power and a power increment step;

determining, by the terminal device, the quantity of repeated transmissions of the target data based on the configuration information of the target receive power and a coverage level of the terminal device; or determining, by the terminal device, the quantity of repeated transmissions of the target data based on the configuration information of the target receive power, a power increment step, and a coverage level of the terminal device.

3. The method according to claim 1, wherein determining, by the terminal device, the quantity of repeated transmissions of target data based on the configuration information of the target receive power comprises:

determining, by the terminal device, the quantity of repeated transmissions of the target data based on the configuration information of the target receive power and one or more of the following parameters:

a transmit power of the terminal device, a candidate quantity of repeated transmissions, a path loss value obtained by the terminal device through measurement, or a parameter related to the transmit power of the terminal device.

4. The method according to claim 1, wherein the quantity of repeated transmissions of the target data satisfies any one of the following formulas:

$P1 + P2 \cdot 10 \cdot \log_{10} K \geq T$;

$P1 + P2 \cdot 10 \cdot \log_{10} K \geq T$, and $K \geq K_{CElevel,min}$;

$P1 + (i-1) \cdot P3 + P2 \cdot 10 \cdot \log_{10} K \geq T$; or $P1 + (i-1) \cdot P3 + P2 \cdot 10 \cdot \log_{10} K \geq T$, and $K \geq K_{CElevel,min}$, wherein T is a transmit power threshold obtained through calculation based on the following parameters: the target receive power, a path loss value obtained by the terminal device through a measurement, and a parameter related to a transmit power of the terminal device;

P1 indicates the transmit power of the terminal device, and $P1_{max} \geq P1$, wherein $P1_{max}$ is a maximum transmit power of the terminal device;

P2 indicates a repeated transmission gain adjustment factor;

P3 indicates a power increment step;

K indicates the quantity of repeated transmissions of the target data;

i indicates that the terminal device sends the target data for an $i^{th}$ time, wherein i=1, 2, ..., K; and $K_{CElevel,min}$ indicates a minimum quantity of repeated transmissions corresponding to the terminal device at different coverage levels, and $K \geq K_{CElevel,min}$.

5. The method according to claim 1, further comprising:

determining, by the terminal device, a transmission parameter of the target data based on the quantity of repeated transmissions of the target data and a second mapping relationship, wherein the second mapping relationship is a correspondence between a quantity of repeated transmissions of data and a transmission parameter of the data.

6. The method according to claim 5, wherein the transmission parameter of the data comprises one or more of the following parameters:

a time-frequency resource, a port of a demodulation reference signal DMRS, and a port group to which the port for demodulating the DMRS belongs.

7. The method according to claim 1, wherein the first mapping relationship is a relationship between a quantity of repeated transmissions of data and the random access preamble;

the first mapping relationship is a relationship between a quantity of repeated transmissions of data and a random access preamble group;

the first mapping relationship is a relationship between a quantity of repeated transmissions of data and a random access slot; or the first mapping relationship is a relationship between a quantity of repeated transmissions of data and a transmission parameter of the data.

8. The method according to claim 1, further comprising:

monitoring, by the terminal device, response information for the target data in a time window, wherein a start location of the time window is a location at which the terminal device sends the target data for an $m^{th}$ time, or a first location that can be used to monitor a corresponding physical downlink control channel after the terminal device sends the target data for an $n^{th}$ time, wherein $m = 0, 1, K$, and $n = 0, 1, \ldots, K$.

9. The method according to claim 1, wherein the determining, by the terminal device, the quantity of repeated transmissions of the target data based on the configuration information of the target receive power comprises:

determining, by the terminal device based on the configuration information of the target receive power, a quantity of repeated transmissions of a physical uplink shared channel PUSCH in a first message MsgA in a random access procedure, wherein the MsgA comprises the PUSCH and a random access preamble, and a quantity of repeated transmissions of the random access preamble is the same as the quantity of repeated transmissions of the PUSCH.

10. The method according to claim 1, further comprising if the terminal device receives an acknowledgement response information for the target data when a quantity of transmissions of the target data does not reach the quantity of repeated transmissions of the target data, stopping, by the terminal device, sending the target data.

11. A communication apparatus, comprising a communication interface and a processing unit, wherein the communication interface is configured to receive configuration information of a target receive power from a network device;

the processing unit is configured to:
   determine a quantity of repeated transmissions of target data based on the configuration information of the target receive power;
   determine a random access preamble based on the quantity of repeated transmissions of the target data and a first mapping relationship, wherein the first mapping relationship comprises a relationship between the quantity of repeated transmissions of the target data and the random access preamble; and the communication interface is further configured to send the target data and the random access preamble based on the quantity of repeated transmissions of the target data.

12. The apparatus according to claim 11, wherein the processing unit is further configured to:
   determine the quantity of repeated transmissions of the target data based on the configuration information of the target receive power and a power increment step;
   determine the quantity of repeated transmissions of the target data based on the configuration information of the target receive power and a coverage level of the terminal device; or
   determine the quantity of repeated transmissions of the target data based on the configuration information of the target receive power, a power increment step, and a coverage level of the terminal device.

13. The apparatus according to claim 11, wherein the processing unit is further configured to:
   determine the quantity of repeated transmissions of the target data based on the configuration information of the target receive power and one or more of the following parameters:
   a transmit power of the communication apparatus, a candidate quantity of repeated transmissions, a path loss value obtained by the processing unit through a measurement, or a parameter related to the transmit power of the communication apparatus.

14. The apparatus according to claim 11, wherein the quantity of repeated transmissions of the target data satisfies any one of the following formulas:

$P1 + P2 \cdot 10 \cdot \log_{10} K \geq T$;

$P1 + P2 \cdot 10 \cdot \log_{10} K \geq T$, and $K \geq K_{CElevel,min}$;

$P1 + (i-1) \cdot P3 + P2 \cdot 10 \cdot \log_{10} K \geq T$; or $P1 + (i-1) \cdot P3 + P2 \cdot 10 \cdot \log_{10} K \geq T$, and $K \geq K_{CElevel,min}$, wherein T is a transmit power threshold obtained through calculation based on the following parameters: the target receive power, a path loss value obtained by the processing unit through a measurement, and a parameter related to a transmit power of the communication apparatus;

P1 indicates the transmit power of the communication apparatus, and $P1_{max} \geq P1$, wherein $P1_{max}$ is a maximum transmit power of the communication apparatus;

P2 indicates a repeated transmission gain adjustment factor;

P3 indicates a power increment step;

K indicates the quantity of repeated transmissions of the target data;

i indicates that the communication interface sends the target data for an $i^{th}$ time, wherein i=1, 2, . . . , K; and $K_{CElevel,min}$ indicates a minimum quantity of repeated transmissions corresponding to the communication apparatus at different coverage levels, and $K \geq K_{CElevel,min}$.

15. The apparatus according to claim 11, wherein the processing unit is further configured to:
   determine a transmission parameter of the target data based on the quantity of repeated transmissions of the target data and a second mapping relationship, wherein
   the second mapping relationship is a correspondence between a quantity of repeated transmissions of data and a transmission parameter of the data.

16. The apparatus according to claim 15, wherein the transmission parameter of the data comprises one or more of the following parameters:
   a time-frequency resource, a port of a demodulation reference signal DMRS, and a port group to which the port for demodulating the DMRS belongs.

17. The apparatus according to claim 11, wherein
   the first mapping relationship is a relationship between a quantity of repeated transmissions of data and the random access preamble;
   the first mapping relationship is a relationship between a quantity of repeated transmissions of data and a random access preamble group;
   the first mapping relationship is a relationship between a quantity of repeated transmissions of data and a random access slot; or
   the first mapping relationship is a relationship between a quantity of repeated transmissions of data and a transmission parameter of the data.

18. A non-transitory computer-readable storage medium storing a computer program that when executed by a communication apparatus causes the communication apparatus to perform a method comprising:
   receiving configuration information of a target receive power from a network device;
   determining a quantity of repeated transmissions of target data based on the configuration information of the target receive power;
   determining a random access preamble based on the quantity of repeated transmissions of the target data and a first mapping relationship, wherein the first mapping relationship comprises a relationship between the quantity of repeated transmissions of the target data and the random access preamble; and
   sending the target data and the random access preamble based on the quantity of repeated transmissions of the target data.

* * * * *